(12) United States Patent
Owens et al.

(10) Patent No.: US 12,188,742 B2
(45) Date of Patent: Jan. 7, 2025

(54) GRIP COMPONENT FOR AN ELECTROMECHANICAL GUN

(71) Applicant: Biofire Technologies Inc., Broomfield, CO (US)

(72) Inventors: Christopher James Owens, Denver, CO (US); Bryan Edward Rogers, Aurora, CO (US); Benjamin William Dwyer, Golden, CO (US); Donna Kelley, Louisville, CO (US); Jack Hugo Thiesen, Firestone, CO (US); Kai Thorin Kloepfer, Denver, CO (US)

(73) Assignee: Biofire Technologies Inc., Broomfield, CO (US)

( * ) Notice: Subject to any disclaimer, the term of this patent is extended or adjusted under 35 U.S.C. 154(b) by 0 days.

(21) Appl. No.: 17/661,022

(22) Filed: Apr. 27, 2022

(65) Prior Publication Data

US 2022/0341702 A1    Oct. 27, 2022

Related U.S. Application Data

(60) Provisional application No. 63/180,616, filed on Apr. 27, 2021.

(51) Int. Cl.
| | |
|---|---|
| *F41A 17/06* | (2006.01) |
| *F41C 23/10* | (2006.01) |
| *G01S 15/04* | (2006.01) |
| *G01S 17/04* | (2020.01) |
| *G01V 3/08* | (2006.01) |
| *G01V 3/10* | (2006.01) |

(52) U.S. Cl.
CPC .............. *F41C 23/10* (2013.01); *F41A 17/06* (2013.01); *F41A 17/066* (2013.01); *G01S 15/04* (2013.01); *G01S 17/04* (2020.01); *G01V 3/088* (2013.01); *G01V 3/10* (2013.01)

(58) Field of Classification Search
CPC ......... F41A 17/06; F41A 17/066; F41A 17/20
See application file for complete search history.

(56) References Cited

U.S. PATENT DOCUMENTS

| | | | | |
|---|---|---|---|---|
| 4,467,545 A | * | 8/1984 | Shaw, Jr. | .............. F41A 17/066 |
| | | | | 42/70.11 |
| 5,090,147 A | * | 2/1992 | Pastor | .................... F41A 17/28 |
| | | | | 42/70.05 |

(Continued)

*Primary Examiner* — Derrick R Morgan
(74) *Attorney, Agent, or Firm* — Perkins Coie LLP; Andrew T. Pettit

(57) ABSTRACT

The present disclosure provides systems and techniques for determining whether a user is holding a gun. The gun may include a sensor, such as a laser proximity sensor, a capacitive proximity sensor, a load cell, an accelerometer, or a biometric sensor, and the gun may determine whether a user is holding the gun based on an output generated by the sensor. A processor housed in the gun may identify activation of a proximity sensor, determine that a user is holding the gun based on the activation of the proximity sensor, and perform an action in response to determining that the user is holding the gun. The action performed by the processor may include performing a boot procedure, performing a health check procedure, visually indicating state information about the gun, audibly indicating state information about the gun, or tactilely indicating state information about the gun.

16 Claims, 14 Drawing Sheets

(56) References Cited

U.S. PATENT DOCUMENTS

| | | | | |
|---|---|---|---|---|
| 5,194,677 | A * | 3/1993 | Schuemann | F41A 17/22 42/71.02 |
| 5,459,957 | A * | 10/1995 | Winer | F41A 17/066 42/70.11 |
| 5,502,915 | A * | 4/1996 | Mendelsohn | F41A 17/066 42/70.11 |
| 6,098,330 | A * | 8/2000 | Schmitt | F41A 17/066 42/70.11 |
| 6,253,480 | B1 * | 7/2001 | Florez | F41A 17/06 42/70.07 |
| 6,301,815 | B1 * | 10/2001 | Sliwa | F41A 17/066 42/70.11 |
| 6,360,468 | B1 * | 3/2002 | Constant | F41A 9/53 42/84 |
| 6,442,880 | B1 * | 9/2002 | Allan | F41A 17/066 42/70.11 |
| 6,487,804 | B1 * | 12/2002 | Petrella, Jr. | F41A 17/06 42/70.11 |
| 6,631,579 | B1 * | 10/2003 | Lauster | G07C 9/37 42/70.11 |
| 9,857,133 | B1 | 1/2018 | Kloepfer et al. | |
| 10,126,080 | B2 * | 11/2018 | Martin | F41A 17/066 |
| 10,378,844 | B2 | 8/2019 | Patches et al. | |
| 10,591,237 | B1 | 3/2020 | Cannon | |
| 10,731,936 | B1 * | 8/2020 | Sapio | F41A 11/00 |
| 10,859,334 | B2 * | 12/2020 | Gant | F41A 17/06 |
| 11,080,978 | B1 | 8/2021 | Goldstein | |
| 11,287,213 | B1 * | 3/2022 | Grace | F41B 5/10 |
| 11,320,234 | B1 * | 5/2022 | Simon | F41A 17/20 |
| 11,326,847 | B1 * | 5/2022 | Bango | F41A 17/063 |
| 11,473,866 | B1 * | 10/2022 | Kloepfer | F41A 19/59 |
| 11,555,666 | B1 * | 1/2023 | Moy | F41C 23/08 |
| 2002/0112390 | A1 * | 8/2002 | Harling | H04K 3/20 42/70.11 |
| 2003/0070343 | A1 * | 4/2003 | Glock | F41A 17/063 42/70.11 |
| 2003/0136043 | A1 * | 7/2003 | Lauster | F41A 17/066 42/70.11 |
| 2005/0188583 | A1 * | 9/2005 | Jackson | F41A 17/08 42/70.11 |
| 2013/0125441 | A1 * | 5/2013 | Westwood | F41A 17/20 42/70.11 |
| 2014/0366419 | A1 | 12/2014 | Allan et al. | |
| 2015/0040453 | A1 * | 2/2015 | Ballard | F41A 17/063 42/70.11 |
| 2015/0253093 | A1 * | 9/2015 | Allan | F41A 17/06 42/70.06 |
| 2016/0054081 | A1 * | 2/2016 | Creed | F41A 17/46 42/70.06 |
| 2016/0076842 | A1 * | 3/2016 | Faxon | F41A 17/22 42/69.01 |
| 2016/0165192 | A1 * | 6/2016 | Saatchi | H04N 7/185 386/227 |
| 2016/0195352 | A1 * | 7/2016 | Pikielny | F41A 17/20 42/69.01 |
| 2017/0059274 | A1 | 3/2017 | Crist et al. | |
| 2017/0074611 | A1 * | 3/2017 | Winiecki | G01S 19/14 |
| 2017/0108301 | A1 * | 4/2017 | Murphy, II | F41C 23/16 |
| 2017/0234641 | A1 | 8/2017 | Farrell et al. | |
| 2017/0248388 | A1 | 8/2017 | Young et al. | |
| 2017/0337513 | A1 | 11/2017 | Dimino et al. | |
| 2018/0142977 | A1 * | 5/2018 | Kloepfer | F41A 17/066 |
| 2018/0259280 | A1 * | 9/2018 | Martin | F41A 17/066 |
| 2018/0372443 | A1 * | 12/2018 | Lyman | F41C 23/10 |
| 2019/0281259 | A1 | 9/2019 | Palazzolo et al. | |
| 2019/0331448 | A1 * | 10/2019 | Murphy, II | F41C 23/16 |
| 2020/0003511 | A1 | 1/2020 | Deng et al. | |
| 2020/0011629 | A1 | 1/2020 | Deng et al. | |
| 2020/0049449 | A1 * | 2/2020 | Haase | F41C 23/10 |
| 2020/0049450 | A1 * | 2/2020 | Willits | F41C 23/14 |
| 2020/0191511 | A1 | 6/2020 | Breda | |
| 2020/0355456 | A1 | 11/2020 | Deng et al. | |
| 2020/0380585 | A1 | 12/2020 | Hare et al. | |
| 2021/0020008 | A1 | 1/2021 | Deutsch | |
| 2021/0102778 | A1 * | 4/2021 | Fortin | F41C 23/10 |
| 2021/0270553 | A1 * | 9/2021 | Noonan | F41A 3/66 |
| 2021/0341236 | A1 * | 11/2021 | Hsu | F41A 3/66 |
| 2021/0381788 | A1 * | 12/2021 | Nilson | F41A 11/02 |
| 2022/0268551 | A1 * | 8/2022 | Noonan | F41A 19/10 |
| 2022/0307787 | A1 * | 9/2022 | Kloepfer | G07C 9/00563 |
| 2022/0325980 | A1 * | 10/2022 | Walker | F41C 23/18 |
| 2022/0349665 | A1 * | 11/2022 | Owens | F41C 23/10 |
| 2022/0373284 | A1 * | 11/2022 | Thiesen | F41A 19/59 |

\* cited by examiner

GRIP COMPONENT FOR AN ELECTROMECHANICAL GUN

CROSS-REFERENCE TO RELATED APPLICATIONS

This application claims priority to U.S. Provisional Application No. 63/180,616, titled "GUN GRIP" and filed on Apr. 27, 2021, which is incorporated by reference herein in its entirety.

FIELD OF TECHNOLOGY

The teachings disclosed herein generally relate to guns, and more specifically to identifying user presence at a gun.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and discard guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems and techniques described herein provides a sensor network that can be embedded in a gun and used to determine that a user is holding the gun. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the described systems and techniques described herein provide for determining whether a user is holding a gun. The gun may include a sensor, such as a laser proximity sensor, a capacitive proximity sensor, a load cell, an accelerometer, or a biometric sensor, and the gun may determine whether a user is holding the gun based on an output generated by the sensor. The sensor may generate the output based on a signal satisfying a threshold, such as a voltage threshold. A processor housed in the gun may identify activation of a sensor, determine that a user is holding the gun based on the activation of the sensor, and perform an action in response to determining that the user is holding the gun. The action performed by the processor may include boot procedure, a system health check procedure, visually indicating state information about the gun, audibly indicating state information about the gun, or tactilely indicating state information about the gun.

Figure 1:
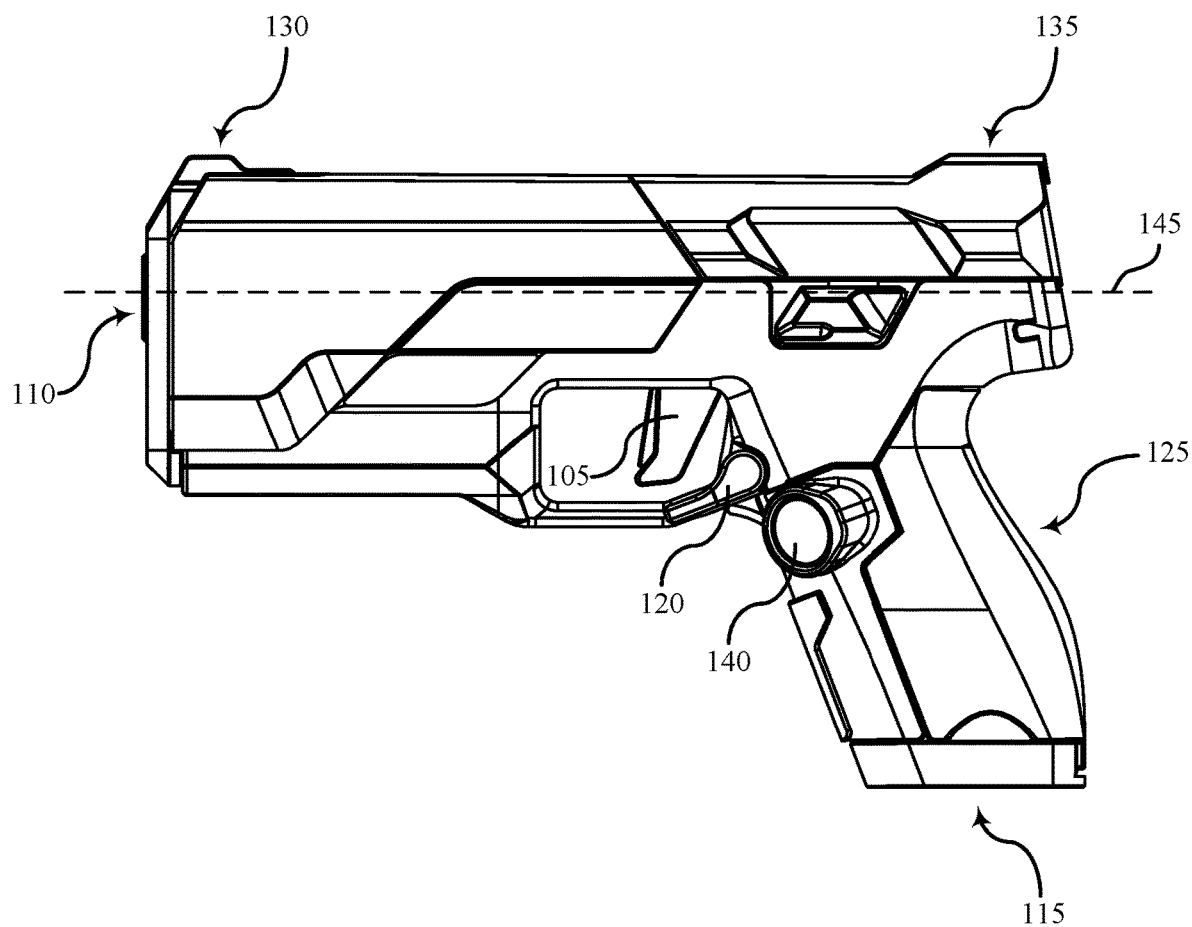
FIG. 1 illustrates an example of a gun that supports systems and techniques for determining whether a user is holding the gun.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Some conventional guns include a grip system with a removable backstrap. Owners of such guns are often free to select a backstrap size to try and make the gun comfortable to grip. The goal of such grip systems is often to provide a grip that allows the owner to reach the trigger while also having a firm but comfortable grip of the gun. Such grip systems can be helpful when the owner just needs to manipulate the trigger, but such grip systems are unsuitable when the gun includes sensors—especially biometric sensors or proximity sensors—located near where such grip systems are installed. As an example, conventional backstraps are largely, if not entirely, unsuitable if a fingerprint scanner is installed along the grip.

Additionally, most conventional grip systems have been designed for mechanical guns that are not capable of determining whether a user is holding the gun. Said another way, most conventional grip systems are designed for mechanical guns that do not include a user presence system. As such, the grips are generally bulky and made from cheap material. Such conventional grip systems fail to function within the context of guns that include electronic sensors, such as proximity sensors and biometric sensors. For example, the backstraps of conventional guns are often made from bulky, dense polymers that do not accommodate laser proximity sensors. Bulky backstraps occupy a significant amount of space making it difficult or impossible to fit proximity sensors inside the grip, and dense polymers can result in unreliable or non-functional proximity sensors.

Introduced here, therefore, is a grip system for a gun that includes, or is able to accommodate, one or more electronic sensors. Examples of electronic sensors (or simply "sensors") include biometric sensors, such as fingerprint scanners, palmprint scanners, vein pattern scanners, etc., and proximity sensors, such as laser proximity sensors, capacitive proximity sensors, inductive proximity sensors, etc. The grip system described herein may include a backstrap component (or simply "backstrap") that is configured to be attached to the back of a gun, such as a semi-automatic pistol. The backstrap may be chosen to provide a grip system that is comfortable, while also guiding one or more fingers into predetermined positions. For example, the backstrap may guide a second digit (also called an "index finger") into a position such that it can readily manipulate the trigger and also guide a third digit (also called a "middle finger") into a position such that it is naturally located on a fingerprint scanner. The grip system may support multiple sizes of backstraps, and the user may modify the grip system by replacing the backstrap with a different size backstrap. The backstrap may include a window portion that allows light to pass through. In some embodiments, the window is designed such that light in certain ranges of the electromagnetic spectrum, such as infrared (IR) light, passes through more easily. For example, the window portion may be nontransmissible to visible light but transmissible to IR light. In other words, the window portion may allow IR light to pass through while being visually opaque.

The gun may include a user presence system that supports determining whether a user is holding the gun, and the user presence system may include one or more proximity sensors. The user presence system may include proximity sensors embedded in the grip, and the proximity sensors may be used to determine whether a user (also referred to as an "operator") is holding the gun. Examples of proximity sensors include laser proximity sensors, ultrasonic proximity sensors, capacitive proximity sensors, inductive proximity sensors, and resistive proximity sensors. A laser proximity sensor may transmit a light beam through a window in the grip such that the beam reflects off the hand holding the gun, and the laser proximity sensor may calculate the distance to the hand based on an analysis of the reflected beam. The laser proximity sensor may calculate the distance to the hand based on the angle between a transmission beam and an echo beam, or the laser proximity sensor may calculate the distance to the hand based on the time interval between the transmission of the beam and receipt of the reflected beam (also called the "echo beam").

The grip system may include additional sensors, such as an inertial measurement unit (IMU), a mechanical switch, a pressure sensor, a fingerprint scanner, etc., and the gun may determine whether a user is holding the gun based on an additional sensor. As an example, an IMU may be housed within the grip, and the IMU may be configured with a movement signature, such as a movement signature representing the movement expected as the user picks up the gun, or a movement signature representing the movement expected as the user is holding the gun. The IMU may generate an output indicating that a user is holding the gun in response to determining that the movement of the gun matches the movement signature. As another example, a fingerprint scanner may be embedded in the grip of the gun, and the fingerprint may generate an output in response to detecting a finger contacting the fingerprint scanner. The gun may determine that a user is holding the gun based on the output generated by the fingerprint scanner and/or the IMU, and the gun may perform a boot procedure in response to determining that the user is holding the gun.

The grip system described herein may include a biometric sensor, such as a fingerpaint scanner, a palmprint scanner, a vein pattern scanner, an inductive sensor, or an electrocardiogram (EKG) sensor that is used to determine the identity of the user. The grip system may also house electronic components, such as proximity sensors, electrical circuits, circuit boards, communication channels, microcontrollers, or the like. The grip system accommodates electronic components while also guiding the hand of the user into an appropriate position, such as a position where the middle finger of the hand is contracting a fingerprint scanner and the palm of the hand is contacting a capacitive proximity sensor. As an illustrative example, the left side of the grip may include a fingerprint scanner and the rear of the grip may include a laser proximity sensor. As the user holds the gun the heel of the hand may block a beam emitted by the laser proximity sensor and the middle finger of the hand may contact the fingerprint scanner. The grip system described herein provides an ergonomic grip that is comfortable and facilitates the reliable operation of both proximity sensors and biometric sensors.

Embodiments may be described in the context of executable instructions for the purpose of illustration. For example, a processor housed in a gun may be described as being capable of executing instructions in response to determining that a user is holding the gun. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor do they necessarily refer to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that supports systems and techniques for determining whether a user is holding the gun 100 in accordance with aspects of the present disclosure. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an IMU configured to identify a presence event in response to measuring movement that matches a movement signature of a user picking up the gun 100. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint sensor (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may include one or more components that facilitate the collection and processing of token data. For example, the gun 100 may include an integrated circuit (also referred to as a "chip") that facilitates wireless communication. The chip may be capable of receiving a digital identifier, such as a Bluetooth® token or a Near Field Communication (NFC) identifier. The term "authentication data" may be used to described data that is used to authenticate a user. For example, the gun 100 may collect authentication data from the user to determine that the user is authorized to operate the gun 100, and the gun 100 may be unlocked in based on determining that the user is authorized to operate the gun 100. Authentication data may include biometric data, token data, or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in memory (e.g., non-volatile memory) of the gun, and the gun may discard or refrain from storing query data in the memory. Thus, the gun 100 may transform authentication data, so as to inhibit unauthenticated use even in the event of unauthorized access of the gun.

The gun 100 may support various types of aiming sights (or simply "sights"). At a high level, a sight is an aiming device that may be used to assist in visually aligning the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights—namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

The presence sensor 125 may support determining whether a user is holding the gun 100. The presence sensor 125 may be an example of a proximity sensor, a pressure sensor, a mechanical switch, or an accelerometer. For example, the presence sensor 125 may be an example of a laser proximity sensor, a capacitive proximity sensor, a load cell, or an accelerometer, and the gun 100 may determine whether a user is holding the gun 100 based on an output generated by the presence sensor 125. The presence sensor 125 may generate the output based on a signal satisfying a threshold, such as a voltage threshold. A processor housed in the gun 100 may identify activation of the presence sensor 125 based on the output, determine that a user is holding the gun 100 based on the activation of the presence sensor 125, and perform an action in response to determining that the user is holding the gun 100. The action performed by the processor may include performing a boot procedure, performing a system health check procedure, visually indicating state information about the gun 100, audibly indicating state information about the gun 100, or tactilely indicating state information about the gun 100. The system health check procedure may include calculating a battery charge state, a processor state, or the like. The state information may include a locked state, an unlocked state, an authenticating state, a charging state, a low battery state, or the like.

Figure 2:
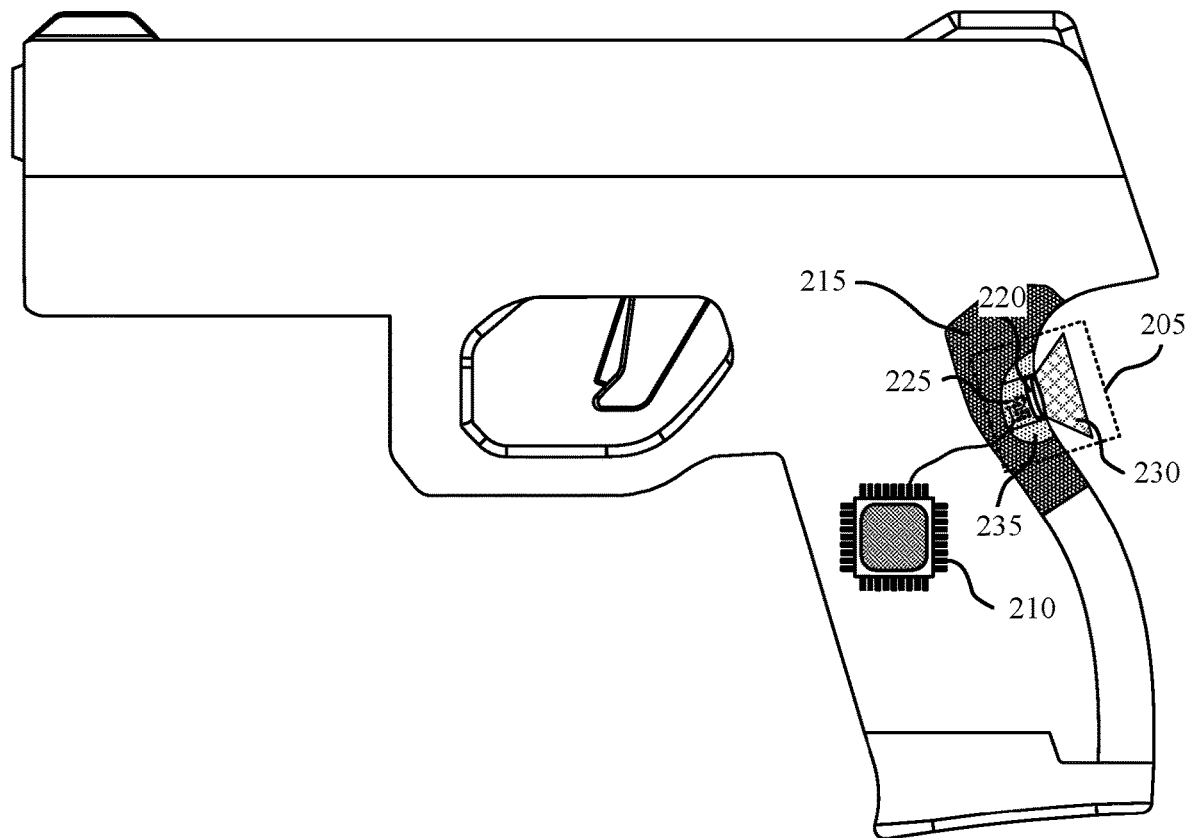
FIG. 2 illustrates an example of a gun that includes a laser proximity sensor.

FIG. 2 illustrates an example of a gun 200 that includes a laser proximity sensor 205, a processor 210, and a grip component 215. The grip component 215 is an example of a backstrap that is removably attached to the gun 200. The laser proximity sensor 205 may be used to determine whether a user is holding the gun 200.

The laser proximity sensor 205 includes a laser diode 220 and a controller 225. The laser diode 220 may be configured to transmit electromagnetic radiation 230 through a window 235, and the controller 225 may be configured to generate an output based on the amount of electromagnetic radiation that returns through the window 235. The output generated by the controller 225 may be an interrupt signal that is transmitted to the processor 210, and the processor 210 may perform a boot procedure based on the output. The processor 210 may include multiple cores, and the processor may transition one or more cores from a sleep state (e.g., a low-power state, a standby state, etc.) to a wake state (e.g., a high-power state, an operational state, etc.) as part of the boot procedure. For example, as part of the boot procedure, a first core may load a memory address indicating the location of boot media, such as a boot image (or simply an "image"), into a register of a second core such that the second core can execute instructions of the boot media.

As an illustrative example, the electromagnetic radiation 230 may be infrared electromagnetic radiation, and the window 235 may be largely or entirely nontransmissible to visible electromagnetic radiation but entirely or largely transmissible to infrared electromagnetic radiation. In other words, the window 235 of the grip component 215 may be visually opaque but transmissible to infrared electromagnetic radiation. In some examples, the 235 may be transmissible to infrared light only. For example, the window 235 may only permit limited transmission of light other than infrared light. The laser diode (e.g., a vertical-cavity surface emitting laser (VCSEL), a light-emitting diode (LED), etc.) may be positioned and oriented to transmit infrared electromagnetic radiation through the window 235, and the controller 225 may generate a signal representing the amount of infrared electromagnetic radiation returning through the window 235. The controller 225 may determine that the signal satisfies a threshold, and the controller may transmit an interrupt signal to the processor 210 in response to determining that the signal satisfies the threshold. The controller 225 may generate the interrupt signal based on the signal being greater than a high-threshold, based on the signal being less than a low-threshold, or based on both. In other words, the controller 225 may generate the interrupt when the amount of infrared electromagnetic radiation returning through the window 235 is greater than a high-threshold, when the amount of infrared electromagnetic radiation returning through the window 235 is less than a low-threshold, or when the amount of infrared electromagnetic radiation returning through the window 235 is both greater than a high-threshold and less than a low-threshold.

Figure 3:
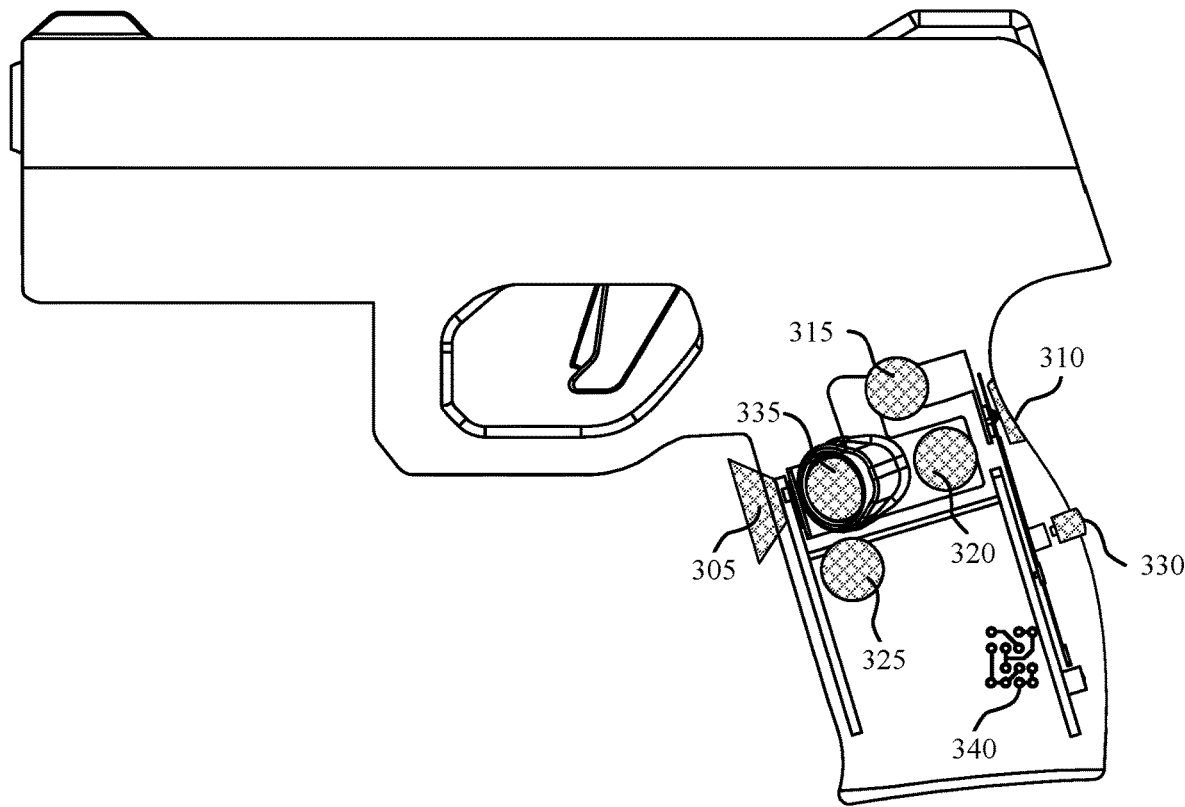
FIG. 3 illustrates an example of a gun that includes a sensor suite that supports determining whether a user is holding the gun.

FIG. 3 illustrates an example of a gun 300 that includes a sensor suite which may be used to determine whether a user is holding the gun 300. A sensor suite may include a proximity sensor, a biometric sensor, an electronic sensor, or any combination thereof The sensor suite shown in FIG. 3 includes a laser proximity sensor 305, a capacitive proximity sensor 310, an inductive proximity sensor 315, an ultrasonic proximity sensor 320, a pressure sensor 325, a mechanical switch 330, a fingerprint scanner 335, and an accelerometer 340. The sensors of the sensor suite may be communicatively coupled with a processor. For example, a processor may be embedded in the gun 300, and the sensors of the sensor suite may be communicatively coupled with the processor via a physical transmission medium.

A sensor of the sensor suite may be activated by generating an output (e.g., interrupt signal) in response to analyzing a signal, and the processor may perform an action in response to receiving one or more outputs. Examples of actions performed by the processor include performing a boot procedure, visually conveying state information, audibly conveying state information, or tactilely conveying state information. State information may include a locked state, an unlocked state, a wake state, a sleep state, a user-present state, a user-not-present state, or the like. As an illustrative example, the processor may determine that a user is holding the gun 300 based on identifying an output generated by the laser proximity sensor 305 and an output generated by the mechanical switch 330. In response to determining that the user is holding the gun 300, a primary core of the processor may cause a secondary core of the processor to execute a boot image. The processor may additionally or alternatively cause an LED to be illuminated and cause a haptic motor to generate a haptic pulse.

The sensors shown in FIG. 3 may include, or be communicatively coupled with, a controller (e.g., a digital signal processor (DSP), a field programmable gate array (FPGA), a microcontroller, etc.). A controller may be coupled with one or more sensors. For example, the laser proximity sensor 305 may include a DSP configured to determine whether a signal representing the amount of returning electromagnetic radiation satisfies a threshold, and the mechanical switch 330 may be coupled with a microcontroller that is configured to receive an analog signal from the mechanical switch 330 and determine whether the analog signal satisfies a threshold. The mechanical switch 330 may be an example of a Hall effect sensor that generates magnetic flux in response to the mechanical switch 330 being displaced by a user gripping the gun 300, and the voltage of the analog signal may represent the strength or density of magnetic flux created by the Hall effect sensor. The microcontroller may additionally or alternatively be configured to receive a signal from the capacitive proximity sensor 310 and determine whether the signal satisfies a threshold.

The processor may determine that the user is holding the gun 300 in response to an output, or in response to determining that a logical condition is satisfied. The processor may determine that a logic condition is satisfies based on at least sensor of the sensor suite generating an output, based on a predetermined sensor of the sensor suite generating an output, based on at least two sensors generating an output, based on a predetermined sensor and at least one additional sensor generating an output, based on at least three sensors generating an output, etc. A sensor may include a dedicated controller or a separate controller. For example, a controller may be located on the same circuit board as a transmitting diode of a sensor, or a controller and a transmitting diode may be located on separate circuit boards. The processor may perform an action in response to an output or in response to determining that a logical condition is satisfied. Actions which may be performed in response to the output or in response to determining that the logical condition is satisfied include performing a boot procedure, indicating a state information, performing a system health check procedure, or the like.

Figure 4:
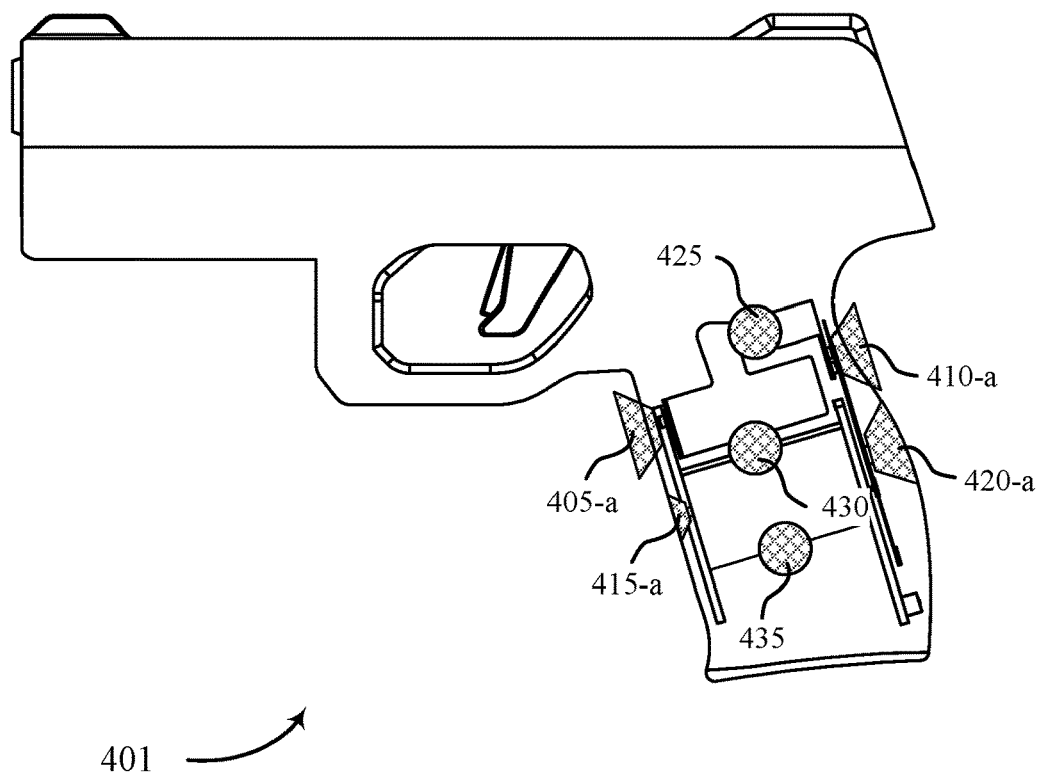
FIG. 4 illustrates examples of guns that include sensor suites.
Figure 4:
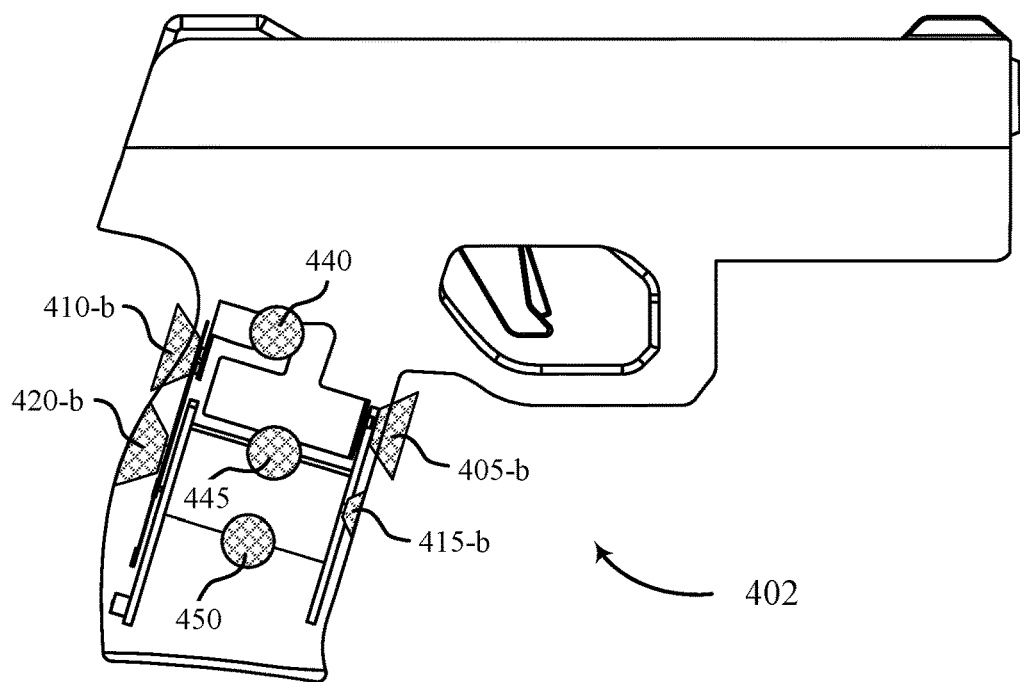

FIG. 4 illustrates an example of a gun 401 and an example of a gun 402 that include sensor suites. The gun 401 depicts a left-side view of a gun and the gun 402 depicts a right-side view of the gun.

The sensor 405-a represents the left-side view of a sensor housed in a forward portion of the grip of the gun, and the sensor 405-b represents the right-side view of the sensor housed in the forward portion of the grip. The sensor housed in the forward portion of the grip may be an example of a laser proximity sensor, a capacitive proximity sensor, an inductive proximity sensor, a mechanical proximity sensor, or the like. As an illustrative example, the sensor housed in the forward portion of the grip may be an example of a laser proximity sensor.

The sensor 410-a represents the left-side view of a sensor housed in a rearward portion of the grip of the gun, and the sensor 410-b represents the right-side view of the sensor housed in the rearward portion of the grip. The sensor housed in the rearward portion of the grip may be an example of a laser proximity sensor.

The sensor 415-a represents the left-side view of a sensor housed in a forward portion of the grip of the gun, and the sensor 415-b represents the right-side view of the sensor housed in the forward portion of the grip. The sensor housed in the forward portion of the grip may be an example of a capacitive proximity sensor.

The sensor 420-a represents the left-side view of a sensor housed in a rearward portion of the grip of the gun, and the sensor 420-b represents the right-side view of the sensor housed in the rearward portion of the grip. The sensor housed in the rearward portion of the grip may be an example of a capacitive proximity sensor.

The sensor 425, the sensor 430, and the sensor 435 represent sensors housed in a left portion of the grip. The sensor 425 may be an example of an ultrasonic sensor, the sensor 430 may be an example of a pressure sensor, and the sensor 435 may be an example of another pressure sensor.

The sensor 440, the sensor 445, and the sensor 450 represent sensors housed in a right portion of the grip. The sensor 440 may be an example of an laser proximity sensor, the sensor 445 may be an example of a capacitive proximity sensor, and the sensor 450 may be an example of an inductive proximity sensor.

A laser proximity sensor may be configured to transmit infrared electromagnetic radiation, visible electromagnetic radiation, or ultraviolet electromagnetic radiation. In other words, a laser proximity sensor may transmit a beam of infrared light, visible light, or ultraviolet light. A laser proximity sensor may be used to determine the distance to an object based on a triangulation principle or a time-of-flight principle. For example, the laser proximity sensor may transmit a beam of light, detect a reflection of the beam of light, calculate the angle between the transmitted beam of light and reflection of the beam of light, and determine the distance to the object causing the reflection based on the calculated angle. As another example, the laser proximity sensor may transmit a beam of light, detect a reflection of the beam of light, calculate the time between transmitting the beam of light and detecting the reflection of the beam of light, and determine the distance to the object causing the reflection based on the calculated time. The beam of light transmitted by a laser proximity sensor may be an example of a point beam, a line beam, or a multi-spot beam.

The sensors described in the context of FIG. 4 are examples of sensors that may be used to determine whether a user is holding a gun, but it should be understood that a gun may include additional or alternative sensors. As an illustrative example, an IMU may be used in additional to a laser proximity sensor. As another illustrative example, a pressure sensor may be used in addition to a capacitive sensor.

Figure 5:
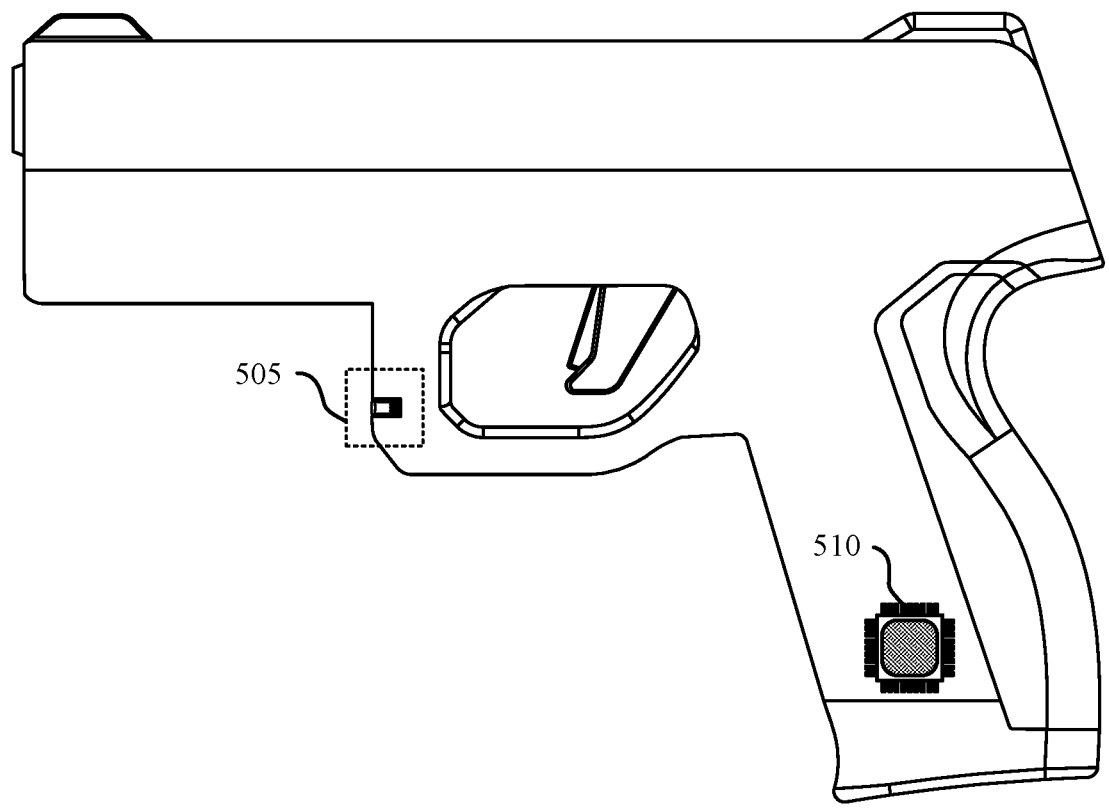
FIG. 5 illustrates an example of a gun that includes an electrical interface that supports downloading software updates.

FIG. 5 illustrates an example of a gun 500 that includes an electrical interface that supports downloading software updates in accordance with aspects of the present disclosure.

The gun 500 includes a physical electrical interface 505 and a wireless electrical interface 510. The physical electrical interface 505 and the wireless electrical interface 510 are examples of electrical interfaces, and it should be understood that a gun described herein may include both the physical electrical interface 505 and the wireless electrical interface 510, just the wireless electrical interface 510, just the physical electrical interface 505, or neither the wireless electrical interface 510 nor the physical electrical interface 505. As an example, a gun may include the physical electrical interface 505 by default, and the gun 500 may include the wireless electrical interface 510 when a user (e.g., a customer or the owner of the gun) conveys a desire to purchase a gun including a wireless electrical interface. As such, the gun 500 may be air-gapped by default, and a user may opt-in to a gun that is not air-gapped. An example of an air-gapped gun is a gun that does not include any wireless communications chips.

The physical electrical interface 505 may be an example of a universal serial bus (USB) interface, a USB type C (USB-C) interface, a micro-USB interface, a mini-USB interface, a Thunderbolt interface, a Lightning interface, or the like. In some examples, the physical electrical interface 505 may be a female interface, while in some other examples the physical electrical interface 505 may be a male interface. The physical electrical interface 505 may be located on the trigger guard of the gun 500, on the grip of the gun 500, or on the frame of the gun 500.

The wireless electrical interface 510 may include an integrated circuit that facilitates wireless communication (e.g., the transmission and/or receiving of wireless signals encoding information). As mentioned above, an integrated circuit that facilitates wireless communication may be referred to as a "chip." The wireless electrical interface 510 may include an antenna, an antenna array, a modulator, a demodulator, a data buffer, or other components that facilitate wireless communication. A transmitting device may transmit a wireless signal encoding information within a radio frequency spectrum region, and a receiving device may receive the wireless signal and decode the information for the wireless signal.

The wireless electrical interface 510 may implement one or more communication protocols. For example, the wireless electrical interface 510 may implement a Bluetooth protocol (e.g., Bluetooth 4.0, Bluetooth low energy (BLE), etc.), a Zigbee protocol (e.g., 802.15.4, 802.15.4z, etc.), a Wi-Fi protocol (e.g., 802.11, 802.11ax, 802.11be, etc.), a fourth generation technology standard (4G), a fifth generation technology standard (5G), a sixth generation technology standard (6G), or the like.

The gun 500 may receive a software update via the physical electrical interface 505 or the wireless electrical interface 510, and the gun 500 may modify a user presence detection procedure based on the software update. For example, the gun 500 may perform a user presence detection produce to determine whether a user is holding the gun 500, and produce may determine that a user is holding the gun in response to a sensor generating an output or in response to a logical condition being satisfied. The software update may define the logical condition, define a threshold for a proximity sensor, define a movement signature for an IMU, define a filtering procedure for filtering data at a sensor, or any combination thereof. The gun 500 may receive the software update, modify the user presence detection procedure based on the software update, and determine that a user is holding the gun based on the modified user presence detection procedure.

Figure 6A:
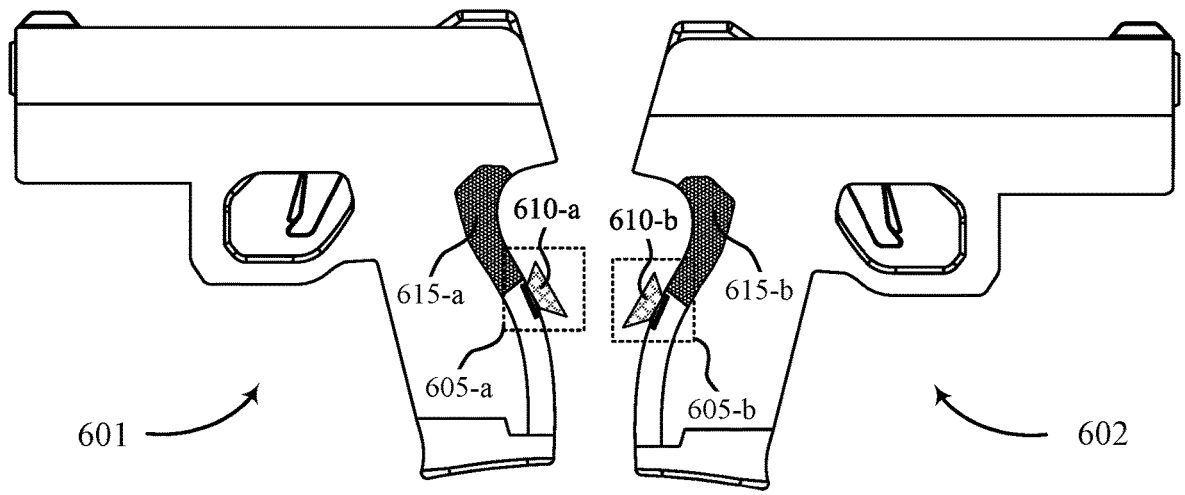
FIGS. 6A and 6B illustrate examples of guns that include removable grip components.

FIG. 6A illustrates an example of a gun 601 and an example of a gun 602. The gun 601 is a left-side view of a gun including a proximity sensor configured to transmit a wave of electromagnetic radiation or an ultrasonic wave through a fixed grip component, and the gun 602 is a right-side view of the gun including a proximity sensor.

Figure 6B:
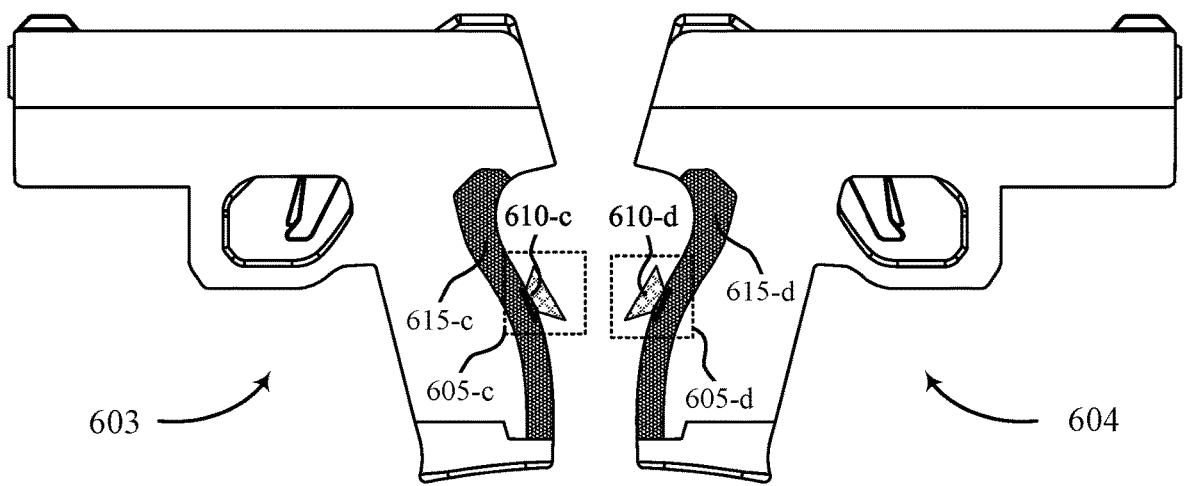

The gun depicted in FIG. 6A includes a proximity sensor that is configured to transmit a wave through a portion of the gun that is external to the backstrap, and the gun depicted in FIG. 6B includes a proximity sensor that is configured to transmit a wave through the backstrap of the gun. A backstrap may also be referred to as a grip component.

The gun 601 includes a proximity sensor 605-*a* that is capable of transmitting a wave 610-*a*. The gun 601 includes a backstrap 615-*a*, and the proximity sensor 605-*a* is configured to transmit the wave 610-*a* through a portion of the grip of the gun that is external to the backstrap 615-*a*. In other words, the proximity sensor 605-*a* is positioned and oriented to transmit the wave 610-*a* through a window portion of the gun that is not encompassed by the backstrap 615-*a*.

The wave 610-*a* may be transmitted through a window portion of the gun 601. As an example, the window portion may be constructed of an infrared transmitting acrylic, and the wave 610-*a* may be an example of a wave of infrared electromagnetic radiation. As another example, the window portion may be constructed of visible or ultraviolet transmitting acrylic, and the wave 610-*a* may be an example of a wave of visible electromagnetic radiation or infrared electromagnetic radiation. As yet another example, the window portion may be constructed of glass or polystyrene, and the wave 610-*a* may be an example of an ultrasonic wave.

The gun 602 includes a proximity sensor 605-*b* that is capable of transmitting a wave 610-*b*. The gun 602 includes a backstrap 615-*b*, and the proximity sensor 605-*b* is configured to transmit the wave 610-*b* through a portion of the grip of the gun that is external to the backstrap 615-*b*. In other words, the proximity sensor 605-*b* is positioned and oriented to transmit the wave 610-*b* through a window portion of the gun that is not encompassed by the backstrap 615-*b*.

FIG. 6B illustrates an example of a gun 603 and an example of a gun 604. The gun 603 is a left-side view of a gun including a proximity sensor configured to transmit a wave of electromagnetic radiation or an ultrasonic wave through a removable grip component, and the gun 604 is a right-side view of the gun.

The gun 603 includes a proximity sensor 605-*c* that is capable of transmitting a wave 610-*c*. The gun 603 includes a backstrap 615-*c*, and the proximity sensor 605-*c* is configured to transmit the wave 610-*c* through the backstrap 615-*c*.

The wave 610-*c* may be transmitted through a window portion of the backstrap 615-*c*. As an example, the window portion may be constructed (or comprised) of an infrared transmitting acrylic, and the wave 610-*c* may be an example of a wave of infrared electromagnetic radiation. As another example, the window portion may be constructed of visible or ultraviolet transmitting acrylic, and the wave 610-*c* may be an example of a wave of visible electromagnetic radiation or infrared electromagnetic radiation. As yet another example, the window portion may be constructed of glass or polystyrene, and the wave 610-*c* may be an example of an ultrasonic wave.

The gun 604 includes a proximity sensor 605-*d* that is capable of transmitting a wave 610-*d*. The gun 604 includes a backstrap 615-*d*, and the proximity sensor 605-*d* is configured to transmit the wave 610-*d* through the backstrap 615-*d*.

Figure 7:
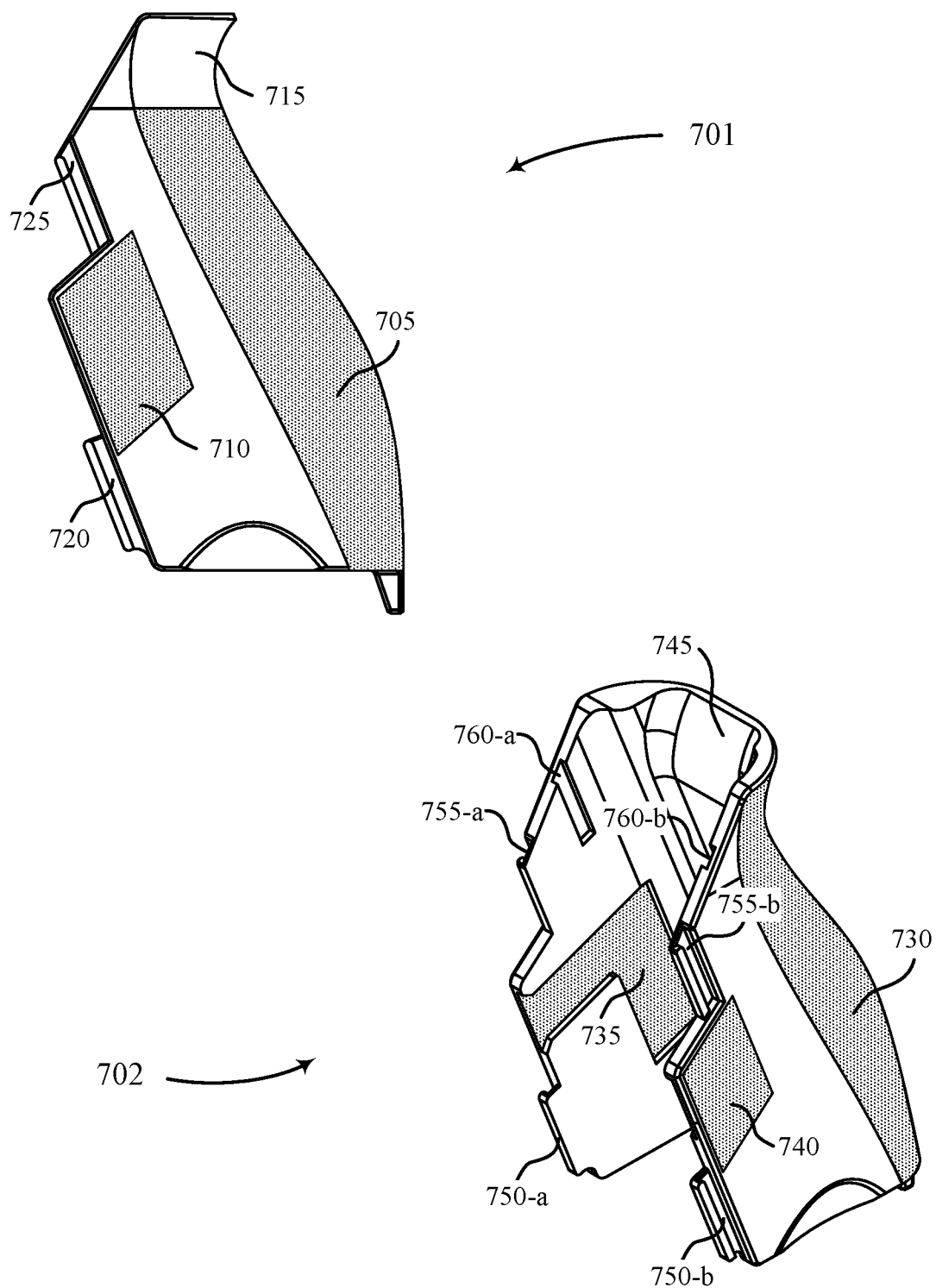
FIG. 7 illustrates an example of a removable grip component.

FIG. 7 illustrates an example of a grip component 701 and a grip component 702 that are aspects of a grip system for a gun that can determine whether a user is holding the gun. The grip component 701 is a left-side view of a grip component and the grip component 702 is an angled-view of a grip component 702. The grip component 701 and the grip component 702 may each depict a view of a grip component described herein. The grip component 701 and/or the grip component 702 may be referred to as a backstrap.

The grip component 701 may be constructed (or comprised) entirely of a material that is transmissible to electromagnetic radiation, or portions of the grip component 701 may be transmissible to electromagnetic radiation. The grip component 701 may be visually opaque but transmissible to infrared radiation, or the grip component 701 may be visually opaque and include one or more window portions that are transmissible to infrared electromagnetic radiation. In some examples, the grip component 701, or window portions thereof, may be transmissible to ultraviolet and/or visible electromagnetic radiation.

The window 705 and the window 710 are examples of windows that are non-transmissible (or largely non-transmissible) to visible electromagnetic radiation while being transmissible (or largely transmissible) to infrared electromagnetic radiation. As an example, the window 705 and the window 710 may be constructed of an infrared transmitting acrylic. A material may be considered largely non-transmissible to visible electromagnetic radiation when 40% or less of the visible electromagnetic radiation that hits the material passes through the material, and a material may be considered largely transmissible to infrared electromagnetic radiation when 60% or more of the infrared electromagnetic radiation that hits the material passes through the material.

The grip component 701 includes a curved portion 715 (also referred to as a "beavertail"). The curved portion 715 may be used to direct the hand of a user downward such that the hand of the user does not contact the slide of the gun as the slide reciprocates rearward. The grip component 701 includes a fastening mechanism 720 and a fastening mechanism 725, which may be used to couple the grip component 701 with a gun. The grip component 701 may be an aspect of a grip system of a gun. For example, the grip component may be an example of a backstrap that can be removably fastened to a gun.

The grip component 702 may be constructed entirely of a material that is transmissible to infrared electromagnetic radiation, or portions of the grip component 702 may be transmissible to infrared electromagnetic radiation. The grip component 702 may be visually opaque but transmissible to infrared radiation, or the grip component 701 may be visually opaque and include one or more window portions that are transmissible to infrared electromagnetic radiation. In some examples, the grip component 702, or window portions thereof, may be transmissible to ultraviolet and/or visible electromagnetic radiation.

The window 730, the window 735, and the window 740 are examples of windows that are non-transmissible (or largely non-transmissible) to visible electromagnetic radiation while being transmissible (or largely transmissible) to infrared electromagnetic radiation. As an example, the window 730, the window 735, and the window 740 may be constructed of an infrared transmitting acrylic. In some examples, one or more of the windows may be transmissible to ultraviolet electromagnetic radiation, visible electromagnetic radiation, or ultrasonic waves. For example, the window 730 may be constructed of a material that is transmissible to ultrasonic waves, the window 735 may be constructed of a material that is transmissible to ultraviolet electromagnetic radiation, and the window 740 may be constructed of a material that is transmissible to visible electromagnetic radiation. It should be understood that a grip component described herein may include one or more window portions that are transmissible to infrared electromagnetic radiation, ultraviolet electromagnetic radiation, visible electromagnetic radiation, or ultrasonic waves.

The grip component 702 includes a curved portion 745 (also referred to as a "beavertail"). The curved portion 745 may be used to direct the hand of a user downward such that the hand of the user does not contact the slide of the gun as the slide reciprocates rearward. The grip component 702 includes a fastening mechanism 750-*a*, a fastening mechanism 750-*b*, a fastening mechanism 755-*a*, a fastening mechanism 755-*b*, a fastening mechanism 760-*a*, and a fastening mechanism 760-*b*. A fastening mechanism of the grip component 702 may include a dovetail joint that supports removably fastening the grip component 702 with a gun. A fastening mechanism of the grip component 702 may additionally or include an aperture and a locking pin configured to removably fastening the grip component 702 with a gun based on the locking pin being inserted into the aperture. The grip component 702 may be an aspect of a grip system of a gun.

A grip component (e.g., a backstrap, the grip component 701, the grip component 702, etc.) may include a window that is located within the grip component such that a laser proximity sensor of a gun is capable of transmitting a beam of light through the window of the grip component when the grip component is fastened to the gun. The grip component therefore supports a stationary user presence system with removable backstraps, which reduces manufacturing cost and allows the backstrap to be quickly swapped to allow multiple users to comfortably use the gun without impacting the reliability of the user presence system.

Figure 8:
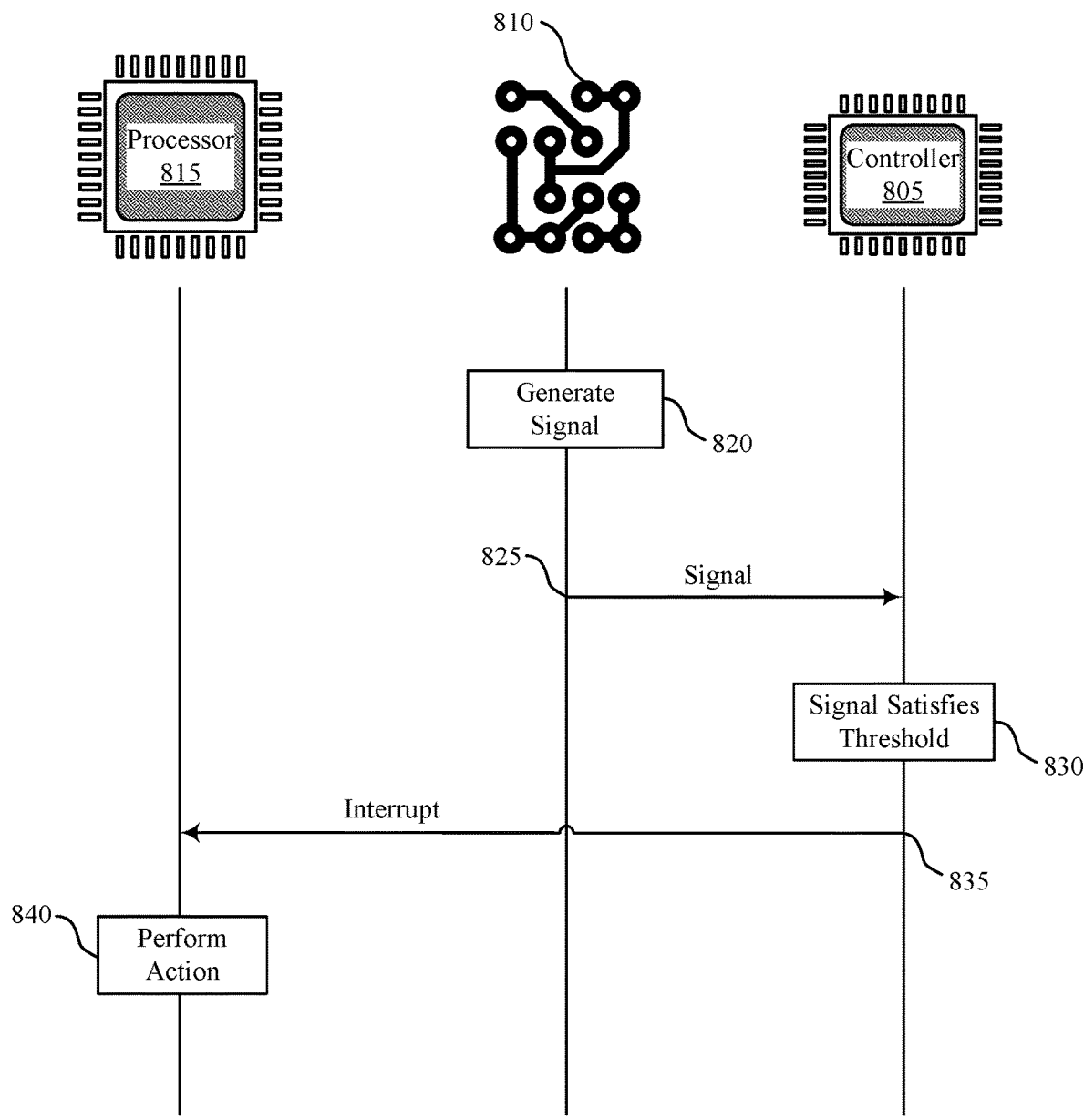
FIG. 8 illustrates an example of a process flow for determining whether a user a grasping a gun.

FIG. 8 illustrates an example of a process flow 800 for determining whether a user is holding a gun. The process flow 800 includes a controller 805, a sensor 810, and a processor 815, which may be examples of the corresponding components described with reference to FIGS. 1 through 7. The controller 805, the sensor 810, and the processor 815 may be aspects of, or coupled with, a gun. The sensor 810 may be an example of a proximity sensor, a mechanical switch, an accelerometer, a biometric sensor, or an electronic sensor that supports determining whether a user is holding the gun. Alternative examples of the following may be implemented, where some steps are performed in a different order than described or are not performed at all. In some cases, steps may include additional features not mentioned below, or further steps may be added.

At step 820, the sensor may generate a signal, and the signal may be used to determine whether a user is holding the gun. As an example, the sensor 810 may be a laser proximity sensor and the signal may represent an amount of light returning to the sensor 810 or a distance of an object from the sensor 810. As another example, the sensor 810 may be a capacitive proximity sensor and the signal may represent a capacitance of the sensor 810. As yet another example, the sensor 810 may be a pressure sensor and the signal may represent an amount of force applied to the sensor 810.

At step 825, the controller 805 may monitor the signal. The controller 805 may be integrated onto the same circuit board of the sensor 810, or the controller 805 may be separate from, and communicatively coupled with, the sensor 810. For example, the controller may be an example of a digital microcontroller that is communicatively coupled with both the sensor 810 and the processor 815. In some examples, the microcontroller may be coupled with one or more additional sensors. The controller 805 may monitor the signal and compare the signal to a threshold.

At step 830, the controller 805 may determine that the signal satisfies the threshold. The controller 805 may transmit an interrupt 835 based on determining that the signal satisfies the threshold, or the controller 805 may transmit the interrupt 835 based on determining that a threshold condition is satisfied. The interrupt 835 is an example of an output generated by the controller 805 in response to determining that the threshold or threshold condition is satisfied. The controller 805 may be configured with one or more thresholds. As an example, a data value may be written to a command register of the controller 805 to configure the controller 805 with a threshold, and the controller 805 may generate the interrupt 835 based on the signal satisfying the threshold. In some examples, an additional data value may be written to an additional command register of the controller 805 to configure the controller with an additional threshold, and the controller 805 may generate the interrupt 835 based on determining that a threshold condition is satisfied, where the threshold condition is satisfied based on the signal satisfying the threshold and the additional threshold. A threshold voltage, a threshold capacitance, and a threshold amperage are examples of thresholds that may be used by the controller 805.

The controller 805 may transmit the interrupt 835 to the processor 815 based on the signal satisfying the threshold or based on the threshold condition being satisfied. The threshold condition may include a logical condition, and the controller 805 may transmit the interrupt 835 based on the logical condition being satisfied. As an example, the controller 805 may determine that the logical condition is satisfied in response to determining that at least two signals corresponding to two sensors satisfy a threshold. As another example, the controller 805 may determine that the logical condition is satisfied in response to determining that at a signal is greater than a high threshold and lower than a low threshold. As yet another example, the controller 805 may determine that the logical condition is satisfied in response to determining that a signal generated by a predetermined sensor satisfies a threshold. The predetermined sensor may be located at a rearward portion of the grip, a left portion of the grip, a right portion of the grip, or a forward portion of the grip below the trigger guard. In some examples, the controller 805 may collect outputs (e.g., interrupts) from one or more additional controllers of the gun, determine that a threshold condition (e.g., a logical condition) is satisfied, and transmit the interrupt 835 to the processor in response to determining that the threshold condition is satisfied. In some examples, the interrupt 835 may be transmitted to an I/O pin of the processor 815, such as a general purpose I/O (GPIO) pin of the processor 815.

At step 840, the processor 815 may perform an action in response to receiving the interrupt 835. The action performed by the processor 815 may include a boot procedure, a gun status indication procedure, or a user authentication procedure. The boot procedure may include waking up one or more cores of the processor 815, the gun status indication procedure may include generating a haptic pulse, illuminating an LED with a predetermined color, illuminating an aiming sight with a predetermined color, displaying an icon at a display mechanism, or generating a sound, and the user authentication procedure may include receiving query data and determining whether the query data matches enrollment data. In some examples, the processor 815 may perform multiple actions in response to the interrupt 835. For example, in response to receiving the interrupt 835, the processor 815 may perform a boot procedure to wake up a core of the processor 815 and an authentication procedure to verify the identity of a user.

Figure 9:
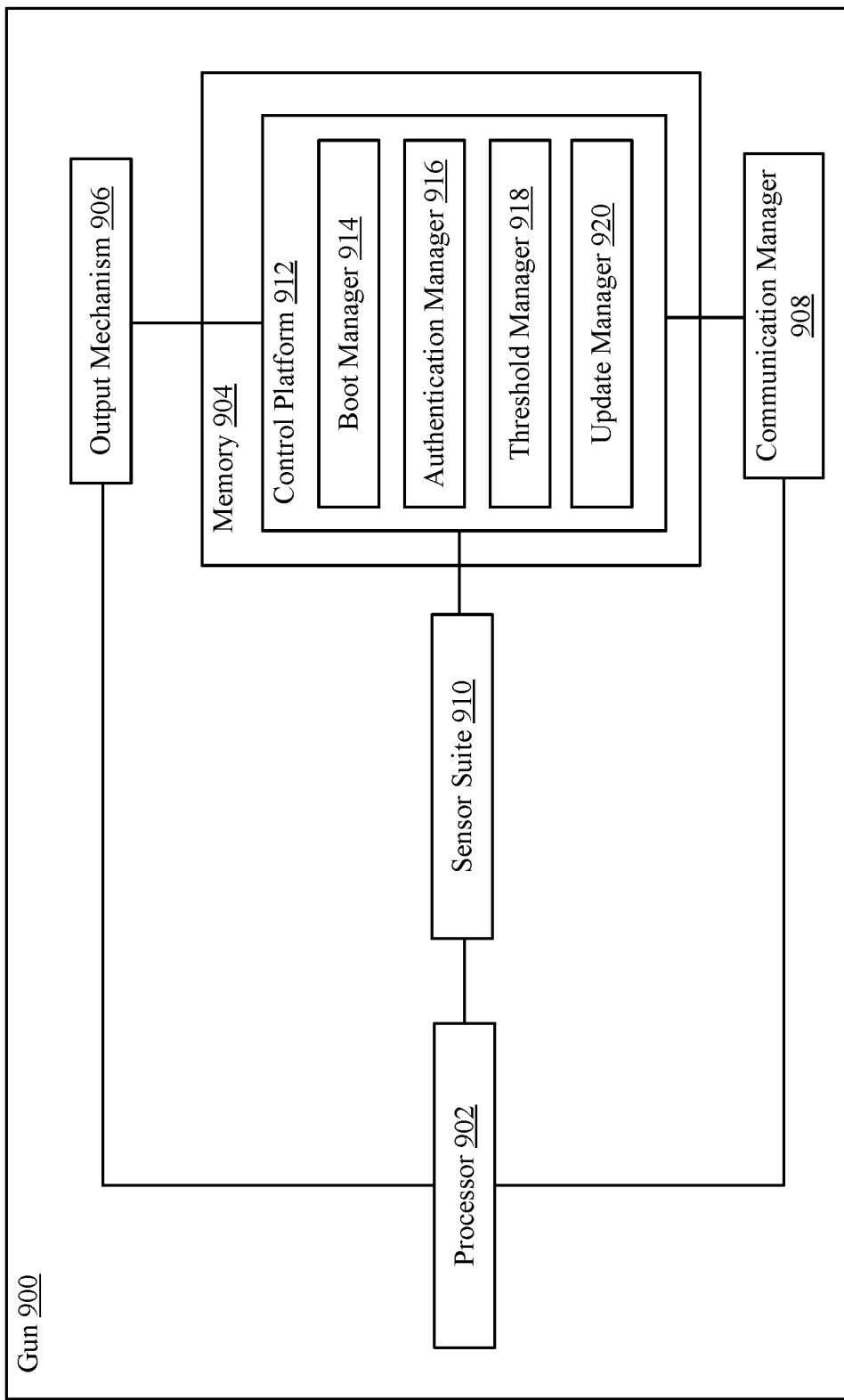
FIG. 9 illustrates an example of a gun that supports determining whether a user is holding the gun.

FIG. 9 illustrates an example of a gun 900 able to implement a control platform 912 designed to produce outputs that are helpful in ensuring the gun 900 is used in an appropriate manner. As further discussed below, the control platform 912 (also referred to as a "management platform" or a "system manager") may be designed to perform a boot procedure, perform a user authentication procedure, perform a user enrollment procedure, configure a controller with a threshold, configure a controller with a threshold condition, or apply a software update.

In some embodiments, the control platform 912 is embodied as a computer program that is executed by the gun 900. In other embodiments, the control platform 912 is embodied as an electrical circuit that performs logical operations of the gun 900. In yet other embodiments, the control platform 912 is embodied as a computer program that is executed by a computing device to which the gun 900 is communicatively connected. In such embodiments, the gun 900 may transmit relevant information to the computing device for processing as further discussed below. Those skilled in the art will recognize that aspects of the computer program could also be distributed amongst the gun 900 and computing device.

The gun 900 can include a processor 902, memory 904, output mechanism 906, and communication manager 908. The processor 902 can have generic characteristics similar to general-purpose processors, or the processor 902 may be an application-specific integrated circuit (ASIC) that provides control functions to the gun 900. As shown in FIG. 9, the processor 902 can be coupled with all components of the gun 900, either directly or indirectly, for communication purposes.

The memory 904 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 902, the memory 904 can also store data generated by the processor 902 (e.g., when executing the managers of the control platform 912). Note that the memory 904 is merely an abstract representation of a storage environment. The memory 904 could be comprised of actual memory chips or managers.

The output mechanism 906 can be any component that is capable of conveying information to a user of the gun 900. For example, the output mechanism 906 may be a display panel (or simply "display") that includes LEDs, organic LEDs, liquid crystal elements, or electrophoretic elements. Alternatively, the display may simply be a series of illuminants (e.g., LEDs) that are able to indicate the status of the gun 900. Thus, the display may indicate whether the gun 900 is presently in a locked state, an unlocked state, an authenticating state, a power-power state, etc. As another example, the output mechanism 906 may be a loudspeaker (or simply "speaker") that is able to audibly convey information to the user.

The communication manager 908 may be responsible for managing communications between the components of the gun 900. Additionally or alternatively, the communication manager 908 may be responsible for managing communications with computing devices that are external to the gun 900. Examples of computing devices include mobile phones, tablet computers, wearable electronic devices (e.g., fitness trackers), and network-accessible server systems comprised of computer servers. The communication manger 908 may receive a software update (or simply an "update") from a computing device such as a server, a smartphone, a tablet, or a flash drive, verify the authenticity of the update, and apply the update to the gun 900. The software update may define a threshold for a sensor of the gun 900, a threshold condition for a controller of the gun 900, or actions to perform in response to determining that a user is holding the gun 900. The processor 902 may determine that a user is holding the gun based on receiving an output, such as receiving an interrupt message from a controller of the gun 900. Accordingly, the communication manager 908 may be wireless communication circuitry that is able to establish communication channels with computing devices. Examples of wireless communication circuitry includechips configured for Bluetooth, Wi-Fi®, NFC, and the like.

Sensors are normally implemented in the gun 900. Collectively, these sensors may be referred to as the "sensor suite" 910 of the gun 900. For example, the gun 900 may include a motion sensor whose output is indicative of motion of the gun 900 as a whole. Examples of motion sensors include multi-axis accelerometers and gyroscopes. The gun 900 may include one or more proximity sensors, such as a laser proximity sensor, a capacitive proximity sensor, an inductive proximity sensor, or a pressure proximity sensor. As another example, the gun 900 may include a proximity sensor whose output is indicative of proximity of the gun 900 to a nearest obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the gun 900 may include a fingerprint scanner or camera that generates images which can be used for biometric authentication. As shown in FIG. 9, outputs produced by the sensor suite 910 may be provided to the control platform 912 for examination or analysis.

For convenience, the control platform 912 may be referred to as a computer program that resides in the memory 904. However, the control platform 912 could be comprised of software, firmware, or hardware components that are implemented in, or accessible to, the gun 900. In accordance with embodiments described herein, the control platform 912 may include a boot manager 914, an authentication manager 916, a threshold manager 918, and an update manager 920. As an illustrative example, the boot manager 914 may set register values to manager one or more cores of the processor 902, the authentication manager 916 may process data obtained from a fingerprint scanner, the threshold manager 918 may set control register values of one or more sensors of the gun 900 to define thresholds, and the update manager 920 may process data obtained from a wired electrical interface of the gun 900 or a wireless electrical interface of the gun 900. Because the data obtained by these managers may have different formats, structures, and content, the instructions executed by these managers can (and often will) be different. For example, the instructions executed by the authentication manager 916 to process data obtained from a fingerprint scanner may be different than the instructions generated by the boot manager 914 to initiate or terminate a procedure executed by a core of the processor 902. As a specific example, the authentication manager 916 may implement image processing algorithms (e.g., for binarization, feature extraction, denoising, despeckling, etc.) that are not necessary for setting register values.

Figure 10:
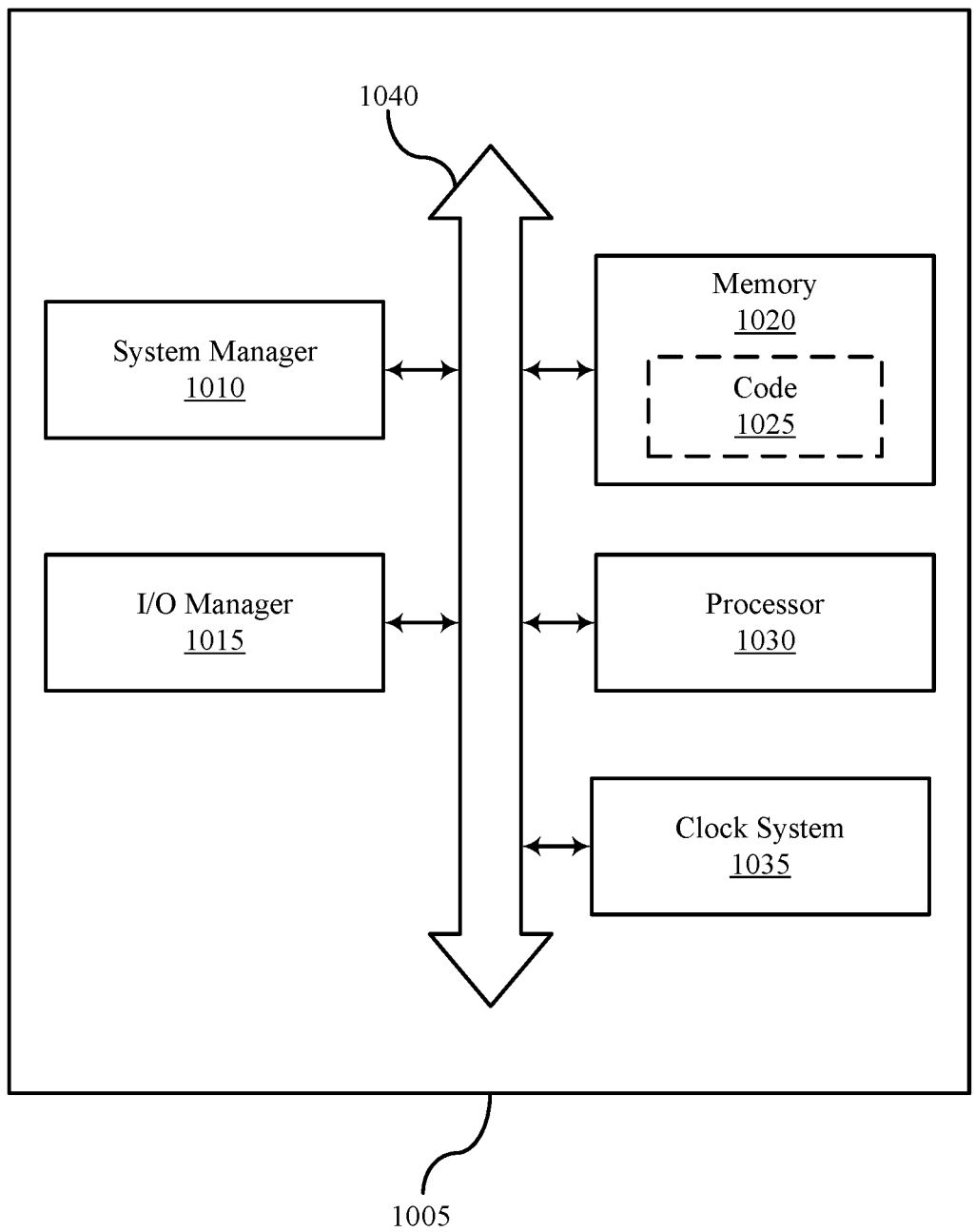
FIG. 10 illustrates an example of a system that supports a dynamic sensor suite that can be used to determine whether a user is holding a gun.

FIG. 10 illustrates an example of a system 1000 that supports a user presence system which may be implemented in a gun. The device 1005 may be operable to implement the techniques, technology, or systems disclosed herein. The device 1005 may include components such as a system manager 1010, an input/output (I/O) manager 1015, memory 1020, code 1025, a processor 1030, a clock system 1035, and a bus 1040. The components of the device 1005 may communicate via one or more buses 1040. The device 1005 may be an example of, or include components of, a gun, gun grip, or an electronic grip system.

The system manager 1010 may determine that a user is holding the device 1005 and initiate a boot procedure at the processor 1030 in response to determining that the user is holding the device 1005. For example, the system manager 1010 may identify activation of a proximity sensor based on the proximity sensor generating an output in response to determining that a signal satisfies a threshold. The proximity sensor may be housed in the device 1005, and the proximity sensor may be an example of a laser proximity sensor, a capacitive proximity sensor, an indicative proximity sensor, a force proximity sensor, or the like. The system manager 1010 may determine, based on the activation of the proximity sensor, that a user is holding the device 1005 and perform a boot procedure to transition the processor 1030 from a sleep state to a wake state, where the processor 1030 is communicatively coupled with the proximity sensor. The sleep state may correspond to a state where one or fewer cores of the processor 1030 is processing data, and the wake state may correspond to a state where at least two cores of the processor 1030 are processing data.

The I/O manager 1015 may manage input and output signals for the device 1005. The I/O manager 1015 may also manage various peripherals such an input device (e.g., a button, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 1020 may include or store code (e.g., software) 1025. The memory 1020 may include volatile memory, such as random-access memory (RAM) and/or non-volatile memory, such as read-only memory (ROM). The code 1025 may be computer-readable and computer-executable, and when executed, the code 1025 may cause the processor 1030 to perform various operations or functions described here.

The processor 1030 may be an example or component of a central processing unit (CPU), an application specific integrated circuit (ASIC), or a field programmable gate array (FPGA). In some embodiments, the processor 1030 may utilize an operating system or software such as Microsoft Windows®, iOS®, Android®, Linux®, Unix®, or the like. The clock system 1035 control a timer for use by the disclosed embodiments.

The system manager 1010, or its sub-components, may be implemented in hardware, software (e.g., software or firmware) executed by a processor, or a combination thereof. The system manager 1010, or its sub-components, may be physically located in various positions. For example, in some cases, the system manager 1010, or its sub-components may be distributed such that portions of functions are implemented at different physical locations by one or more physical components.

Figure 11:
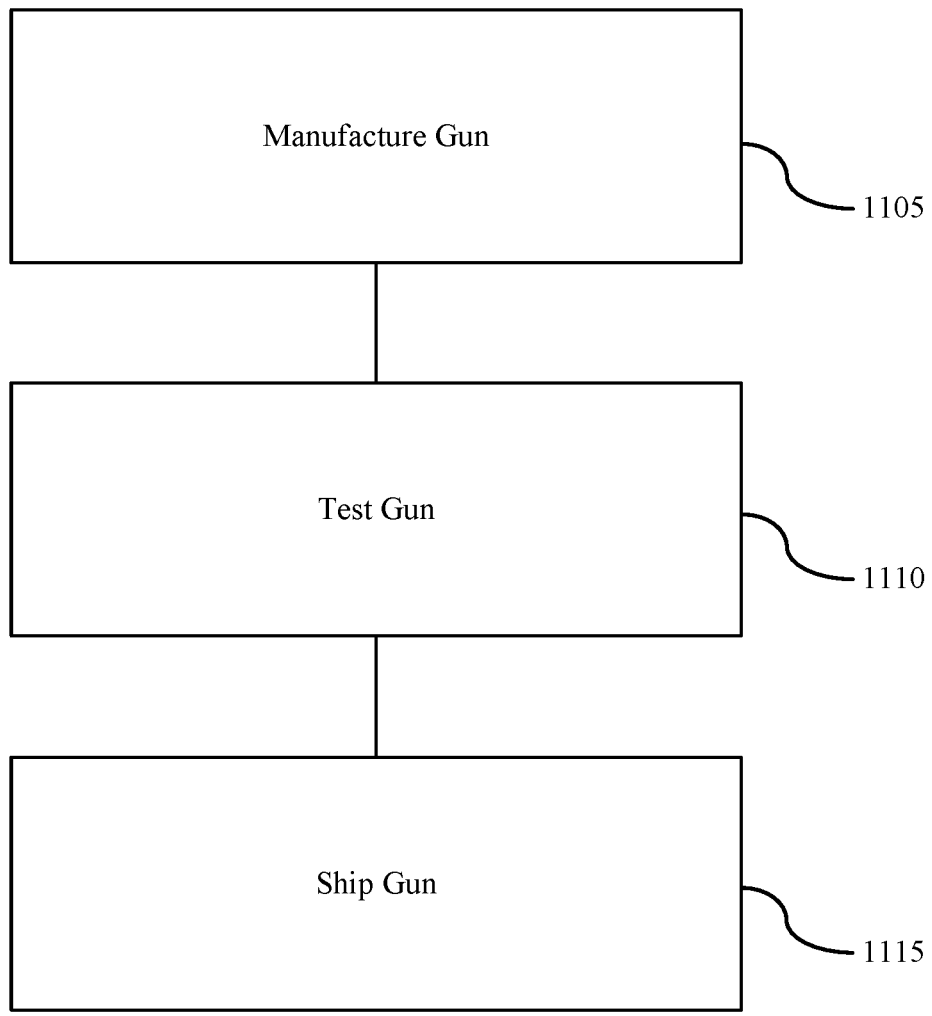
FIG. 11 illustrates an example of a flowchart showing a method of manufacturing a gun and gun components.

FIG. 11 illustrates an example of a flowchart 1100 showing a method of manufacturing a gun and gun components. The gun may be a gun that includes a user presence system which may be used to determine whether a user is holding the gun. A user presence system may include a proximity sensor capable of generating an output and a controller configured to determine that a user is holding the gun based on the output. An example of a gun component is a backstrap that is compatible with a laser proximity sensor. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1105). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. Often, the manufacturer will obtain some parts and make other parts that are assembled together to form the gun (or a component of the gun).

The manufacturer may build or obtain sensors and assemble the gun such that the sensors are embedded in the grip of the gun, housed within the grip of the gun, or otherwise encompassed in the gun. The sensors may an include a proximity sensor, a biometric sensor, or other electronic sensors, such as a mechanical switch or an accelerometer. The manufacturer may position and orient a laser proximity sensor such that a transmitting diode of the laser proximity sensor is capable of transmitting a beam of light through a window portion of the grip of the gun. The window portion may be located within a backstrap or another grip component of the gun, and the beam of light may be infrared light, visible light, or ultraviolet light.

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may then test the gun (step 1110). In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s) of the gun, or the manufacturer could test the gun as a whole. For example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met. In some examples, the manufacturer may test the laser proximity sensor to verify the orientation and power consumption of the laser proximity laser and a controller to verify the reliability of the controller in determining whether a user is holding the gun.

Testing the gun may include testing software and/or firmware. The manufacturer may test the software and/or firmware to validate the security, performance, or reliability of the software and/or firmware. In some examples, the software may be submitted to one or more third-party entities to audit the software and/or firmware. The software and/or firmware may be tested with emulation tools that simulate the peripheral components of the gun, or the software and/or firmware may be tested on the peripheral components of the gun. In response to testing, the software and/or firmware may be deployed to the gun. The gun may be tested to verify that the gun is able to differentiate between scenarios in which a user is holding the gun and scenarios in which an object (e.g., a table, an article of clothing, etc.) is merely contacting the gun.

Thereafter, the manufacturer may ship the gun to a dealer, or the manufacturer may ship a grip component to a retail store or the home address of a customer (step 1115). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1105 and 1110 either sequentially or simultaneously (e.g., one component may be tested while another component is added to the gun). Thus, the descriptions of these processes are intended to be open ended.

Figure 12:
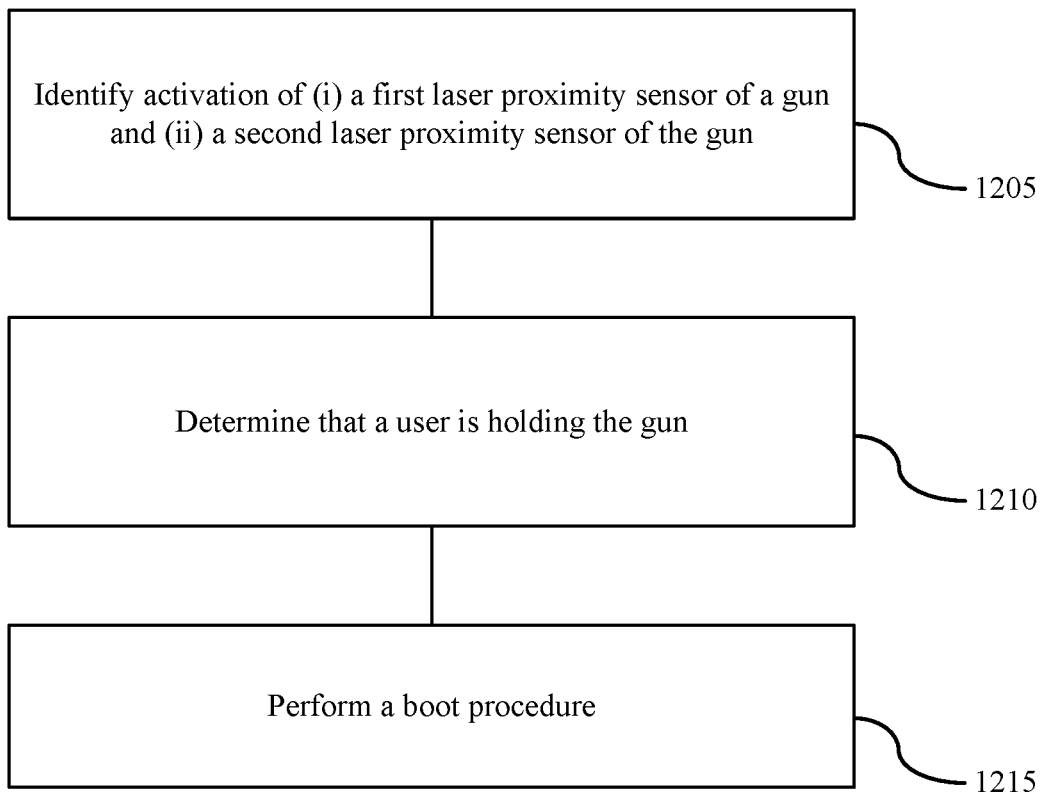
FIG. 12 illustrates an example of a flowchart showing a method of determining that a user is holding a gun.

FIG. 12 shows a flowchart illustrating a method 1200 of determining that a user is holding a gun. The operations of the method 1200 may be implemented by a gun or its components as described herein. For example, the operations of the method 1200 may be performed by a system manager, a processor, or a controller. In some examples, a gun may execute a set of instructions to control the functional elements of the to perform the described functions. Additionally or alternatively, the gun may perform aspects of the described functions using special-purpose hardware.

At step 1205, the gun may identify activation of (i) a first laser proximity sensor of the gun and (ii) a second laser proximity sensor of the gun. The first laser proximity sensor may be housed in a grip component of the gun, such as a backstrap or a grip cavity located proximate to a magazine well. The laser proximity sensor may be configured to transmit electromagnetic radiation in a first direction, where the activation of the first laser proximity sensor is in response to determining that a first signal satisfies a threshold, and where the first signal is representative of electromagnetic radiation returning to the grip component. In other words, the first signal may represent reflect electromagnetic radiation travel in a direction that is opposite to the first direction.

The second laser proximity sensor may be housed in the grip component of the gun. The second laser proximity sensor may be configured to transmit electromagnetic radiation in a second direction that is different from the first direction, where the activation of the second laser proximity sensor is in response to determining that a second signal satisfies a second threshold, and where the second signal is representative of electromagnetic radiation returning to the grip component. In other words, the second signal may represent reflect electromagnetic radiation travel in a direction that is opposite to the second direction. In some examples, the second direction may be perpendicular to the first direction. The electromagnetic radiation may be ultraviolet electromagnetic radiation, visible electromagnetic radiation, or infrared electromagnetic radiation.

At step 1210, the gun may determine that a user is holding the gun. The gun may determine that the user is holding the gun based on the simultaneous activation of the first laser proximity sensor and the second laser proximity sensor. In other words, the gun may determine that the user is holding the gun based on the first laser proximity sensor (or an associated controller) determining that the amount of reflected electromagnetic radiation indicates that an object is close to the first laser proximity sensor and the second laser proximity sensor (or an associated controller) determining that the amount of reflected electromagnetic radiation indicates that an object is close to the second laser proximity sensor while the object is close to the first laser proximity sensor.

At step 1215, the gun may perform a boot procedure. The boot procedure may transition a processor from a sleep state to a wake state, and the processor may be communicatively coupled with the first laser proximity sensor and the second laser proximity sensor. As part of the boot procedure, a primary core of the processor may initiate execution of instructions by a secondary core of the processor. The processor may be housed within the gun, and the processor may be coupled with an energy store, such as a battery or a capacitor.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 13:
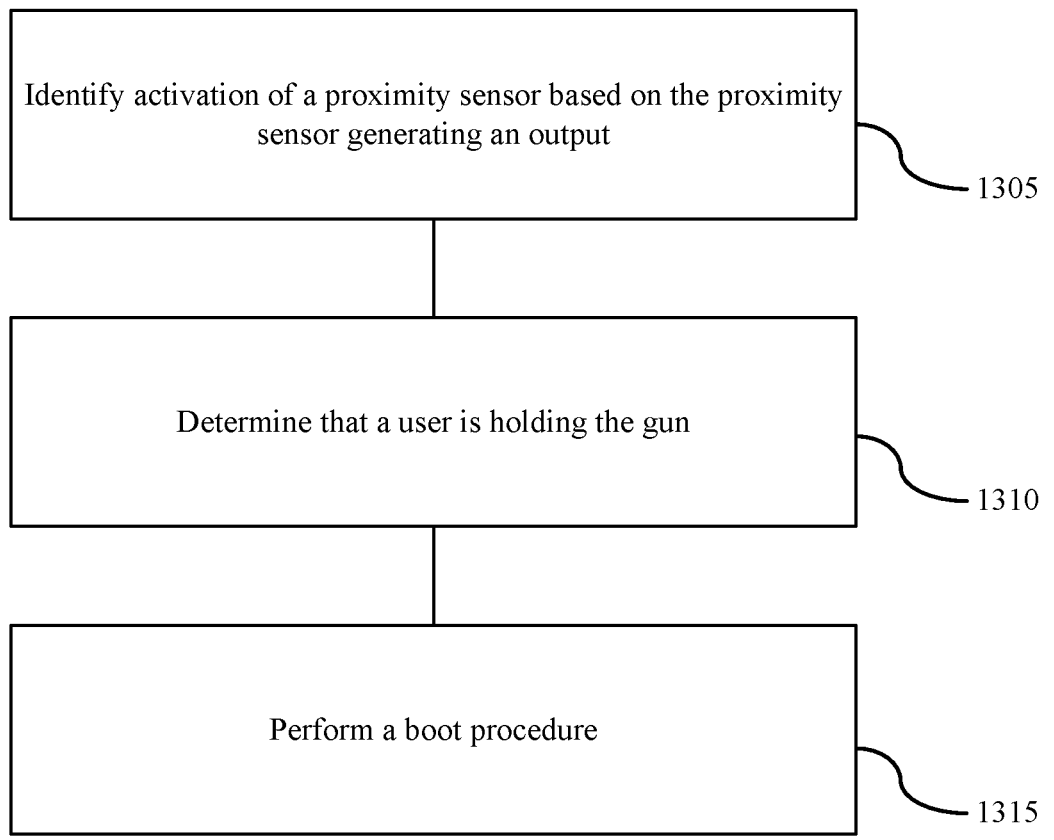
FIG. 13 illustrates an example of a flowchart showing a method of determining that a user is holding a gun.

FIG. 13 shows a flowchart illustrating a method 1300 of determining that a user is holding a gun. The operations of the method 1300 may be implemented by a gun or its components as described herein. For example, the operations of the method 1300 may be performed by a system manager, a processor, or a controller. In some examples, a gun may execute a set of instructions to control the functional elements of the to perform the described functions. Additionally or alternatively, the gun may perform aspects of the described functions using special-purpose hardware.

At step 1305, the gun may identify activation of a proximity sensor based on the proximity sensor generating an output. The proximity sensor may be housed in the gun, and the gun may identify the activation of the proximity sensor in response to determining that a signal satisfies a threshold. The signal may represent a capacitance, reflected electromagnetic radiation, or force applied to the proximity sensor. The proximity sensor, or a controller communicatively coupled with the proximity sensor, may generate the output in response to determining that that signal satisfied the threshold, and the output may indicate that the proximity sensor is activated.

At step 1310, the gun may determine that a user is holding a gun. The gun may determine that the user is holding the gun based on the activation of the proximity sensor. In some examples, the gun may determine that the user is holding the gun based on the activation of at least two proximity sensors, the activation of a predetermined proximity sensor and at least one additional proximity sensor, the activation of at least three proximity sensors, or the activation of at least four proximity sensors.

At step 1315, the gun may perform a boot procedure. The boot procedure may transition a processor from a sleep state to a wake state, and the processor may be communicatively coupled with the proximity sensor. As part of the boot procedure, a primary core of the processor of the gun may initiate execution of instructions by a secondary core of the processor.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 14:
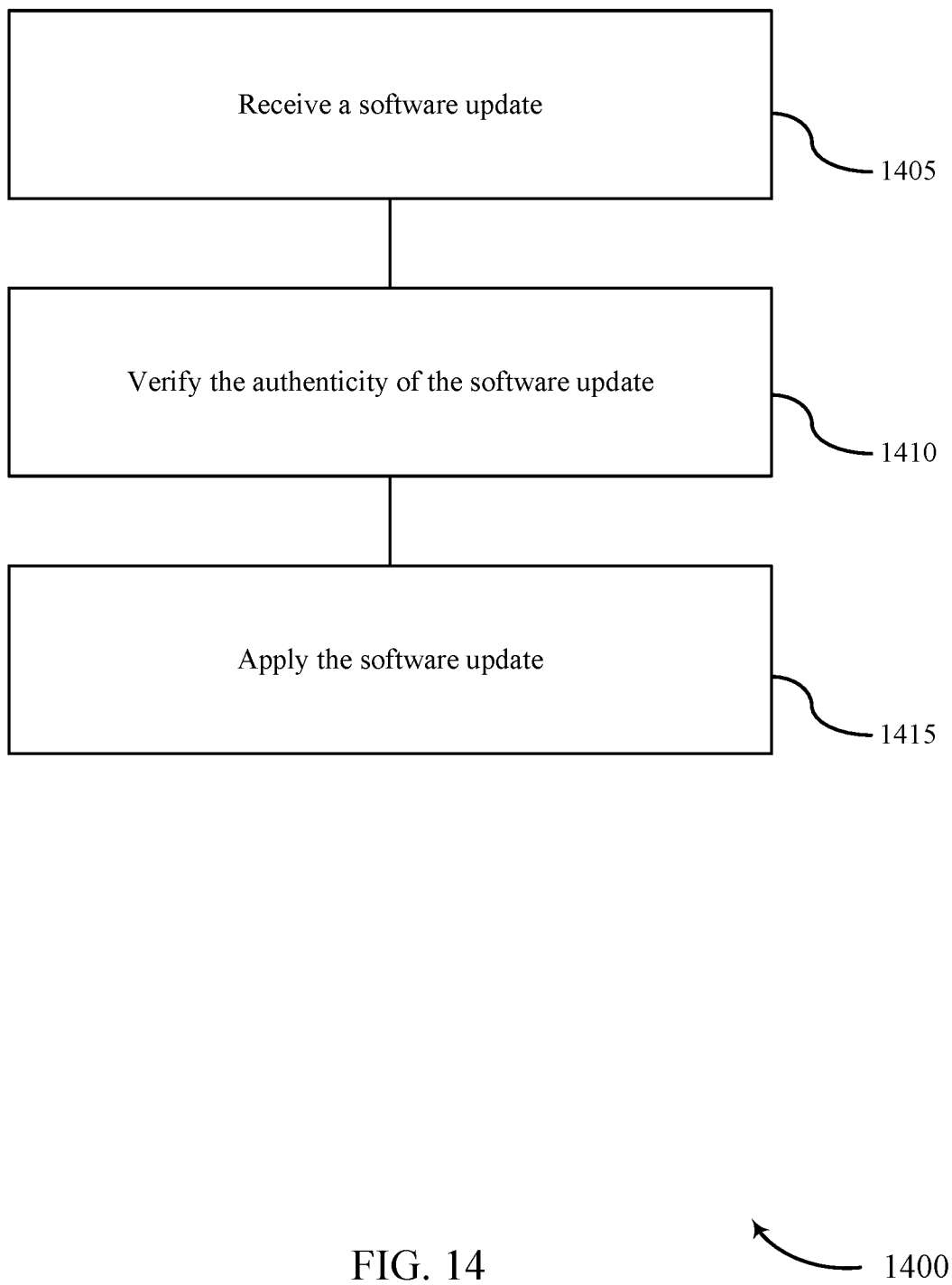
FIG. 14 illustrates an example of a flowchart showing a method of updating software that is executed by a gun.

FIG. 14 shows a flowchart illustrating a method 1400 of updating software for a gun. The operations of the method 1400 may be implemented by a gun or its components as described herein. For example, the operations of the method 1400 may be performed by a system manager, a processor, or a controller. In some examples, a gun may execute a set of instructions to control the functional elements of the to perform the described functions. Additionally or alternatively, the gun may perform aspects of the described functions using special-purpose hardware.

At step 1405, the gun may receive a software update. The gun may receive the software update via an electrical interface of the gun, such as a USB-C connector, a micro-USB connector, a Lightning connector, or the like.

At step 1410, the gun may verify the authenticity of the software update. The gun may verify the authenticity of the software update by verifying a digital signature of the software update, verifying a digital certificate of the software update, performing a random challenge, or any combination thereof. In some examples, the gun may verify the integrity of the software update. The gun may verify the integrity of the software update by generating a checksum value for the received software and comparing the generated checksum to a predetermined checksum value. The gun may determine that the software update is uncorrupted based on the generated checksum value matching the predetermined checksum value, and the gun may determine that the software update is corrupted based on the generated checksum not matching the predetermined checksum.

At step 1415, the gun may apply the software update. The gun may apply the software update based on determining that the software update is authentic and/or uncorrupted. In some examples, the processor of the gun may be rebooted based on applying the software update. Applying the software update may result in defining or modifying a threshold for a proximity sensor, defining or modifying a logical condition for determining that a user is holding the gun, or both.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

EXAMPLES

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a gun including: a grip component including a window portion that is transmissible to infrared electromagnetic radiation but largely or entirely non-transmissible to visible electromagnetic radiation; multiple proximity sensors, each proximity sensor of the multiple proximity sensors including a respective controller configured to generate an output in response to determining that a signal satisfies a threshold, wherein at least one proximity sensor of the multiple proximity sensors includes a laser proximity sensor that is positioned and oriented such that the laser proximity sensor is capable of transmitting infrared electromagnetic radiation through the window portion of the grip component, wherein the signal is representative of infrared electromagnetic radiation returning through the window portion of the grip component; and a processor that is communicatively coupled with each proximity sensor of the multiple proximity sensors, wherein the processor includes multiple cores and is configured to perform a boot procedure in response to receiving the output, the boot procedure including: executing a first set of instructions by a first core of the processor to identify boot media stored in memory of the gun and verify an authenticity of the boot media based on a cryptographic key, and executing a second set of instructions by a second core of the processor based on the authenticity of the boot media, wherein the second set of instructions includes the boot media.

In some examples, the techniques described herein relate to a gun including: a grip component including a window portion that is transmissible to infrared electromagnetic radiation but largely or entirely non-transmissible to visible electromagnetic radiation; a laser proximity sensor including: a transmitter configured to transmit infrared electromagnetic radiation through the window portion of the grip component, and a controller configured to generate an output in response to determining that a signal satisfies a threshold, wherein the signal is representative of infrared electromagnetic radiation returning through the window portion of the grip component; and a processor that is communicatively coupled with the laser proximity sensor, wherein the processor is configured to perform a boot procedure based on the output.

In some examples, the techniques described herein relate to a gun, further including: a capacitive proximity sensor that is communicatively coupled with the processor and housed in the grip component.

In some examples, the techniques described herein relate to a gun, wherein the capacitive proximity sensor includes a second controller configured to: generate a second output in response to determining that a second signal satisfies a second threshold, wherein the second signal is representative of capacitance.

In some examples, the techniques described herein relate to a gun, further including: an inductive proximity sensor that is communicatively coupled with the processor and housed in the grip component.

In some examples, the techniques described herein relate to a gun, wherein the inductive proximity sensor includes a second controller configured to: generate a second output in response to determining that a second signal satisfies a second threshold, wherein the second signal is representative of inductance.

In some examples, the techniques described herein relate to a gun, further including: an ultrasonic proximity sensor that is communicatively coupled with the processor and housed in the grip component.

In some examples, the techniques described herein relate to a gun, wherein the ultrasonic proximity sensor includes: a transmitter configured to direct an ultrasonic wave away from the grip component; and a controller configured to: identify a reflection of the ultrasonic wave; determine a time delta between the directing the ultrasonic wave and the identifying the reflection, and generate a second output based on the time delta satisfying a threshold; wherein performance of the boot procedure is further based on the second output.

In some examples, the techniques described herein relate to a gun, further including: a fingerprint scanner that is communicatively coupled with the processor and configured to generate a second output based on a finger contacting the fingerprint scanner, wherein performance of the boot procedure is further based on the second output.

In some examples, the techniques described herein relate to a gun, wherein the boot procedure includes: executing a first set of instructions by a first core of the processor to identify boot media stored in memory of the gun and verify an authenticity of the boot media based on a cryptographic key; and executing a second set of instructions by a second core of the processor based on the authenticity of the boot media, wherein the second set of instructions includes the boot media.

In some examples, the techniques described herein relate to a gun, wherein the executing the first set of instructions causes: the first core to load a data value into a register of the second core to enable the second core, wherein the executing the second set of instructions by the second core in based on the loading the data value into the register of the second core.

In some examples, the techniques described herein relate to a gun, wherein the processor is further configured to: receive authentication data based on the boot procedure; and perform a user authentication procedure based on the authentication data to identify a user of the gun.

In some examples, the techniques described herein relate to a gun, wherein the processor is further configured to: execute a set of instructions to determine, based on the output, that a first user is holding the gun; receive a software update to containing a second set of instructions; and execute the second set of instructions to determine, based on an additional output of an additional proximity sensor, that a second user is holding the gun.

In some examples, the techniques described herein relate to a gun, wherein the processor is further configured to: determine that a user is holding the gun based on the output, wherein the performing the boot procedure is in response to the determining that the user is holding the gun.

In some examples, the techniques described herein relate to a gun, wherein the processor is further configured to: indicate a state change in response to the determining that a user is holding the gun.

In some examples, the techniques described herein relate to a gun, wherein the indicating the state change includes illuminating a light pipe with a predetermined color, generating a haptic pulse, generating a sound, or any combination thereof In some examples, the techniques described herein relate to a gun, further including: an accelerometer communicatively coupled with the processor, wherein the accelerometer is configured to: measure acceleration of the gun along multiple axes; determine that the measured acceleration of the gun matches a signature stored in memory of the gun; and generate a second output based on the measured acceleration of the gun matching the signature, wherein performance of the boot procedure is further based on the second output.

In some examples, the techniques described herein relate to a gun, further including: a Lidar proximity sensor housed in the grip component of the gun, wherein the Lidar proximity sensor includes a second controller configured to generate a second output in response to determining that a second signal satisfies a second threshold, wherein performance of the boot procedure is further based on the second output.

In some examples, the techniques described herein relate to a gun, wherein the output includes an interrupt signal.

In some examples, the techniques described herein relate to a method of determining that a user is holding a gun, the method including: identifying activation of: (i) a first laser proximity sensor that is housed in a grip component of the gun and configured to transmit electromagnetic radiation in a first direction, wherein the activation of the first laser proximity sensor is in response to determining that a first signal satisfies a threshold, wherein the first signal is representative of electromagnetic radiation returning to the grip component, and (ii) a second laser proximity sensor that is housed in the grip component of the gun, wherein the second laser proximity sensor is configured to transmit electromagnetic radiation in a second direction that is opposite the first direction, wherein the activation of the second laser proximity sensor is in response to determining that a second signal satisfies a second threshold, wherein the second signal is representative of electromagnetic radiation returning to the grip component; determining, based on simultaneous activation of the first laser proximity sensor and the second laser proximity sensor, that the user is holding the gun; and performing a boot procedure to transition a processor from a sleep state to a wake state, wherein the processor is communicatively coupled with the first laser proximity sensor and the second laser proximity sensor.

In some examples, the techniques described herein relate to a method of determining that a user is holding a gun, the method including: identifying activation of a proximity sensor based on the proximity sensor generating an output in response to determining that a signal satisfies a threshold, wherein the proximity sensor is housed in the gun; determining, based on the activation of the proximity sensor, that the user is holding the gun; and performing a boot procedure to transition a processor from a sleep state to a wake state, wherein the processor is communicatively coupled with the proximity sensor.

In some examples, the techniques described herein relate to a method, further including: generating an output based on the signal satisfying the threshold, wherein the identifying the activation of the proximity sensor is based on the output.

In some examples, the techniques described herein relate to a method, further including: transmitting electromagnetic radiation through a window portion of the gun, wherein the signal is representative of electromagnetic radiation returning through the window portion of the gun, and wherein the threshold includes a high-threshold or a low-threshold.

In some examples, the techniques described herein relate to a method, wherein the determining that the signal satisfies the threshold includes: determining, based on the signal, that the electromagnetic radiation returning through the window portion of the gun is greater than the high-threshold.

In some examples, the techniques described herein relate to a method, wherein the determining that the signal satisfies the threshold includes: determining, based on the signal, that the electromagnetic radiation returning through the window portion of the gun is less than the low-threshold.

In some examples, the techniques described herein relate to a method, further including: measuring capacitance, wherein the signal is representative of the capacitance.

In some examples, the techniques described herein relate to a method, wherein the determining that the signal satisfies the threshold includes: determining, based on the signal, that the capacitance satisfies the threshold, wherein the threshold includes a capacitance level.

In some examples, the techniques described herein relate to a method, further including: transmitting electromagnetic radiation through a window portion of the gun, wherein the signal is representative of electromagnetic radiation returning through the window portion of the gun, wherein the output is based on the signal satisfying a threshold, and wherein the proximity sensor includes a laser proximity sensor that is housed in a grip component of the gun; and identifying activation of a second proximity sensor based on the second proximity sensor generating a second output in response to determining that a second signal representing a capacitance value satisfies a second threshold, wherein the second proximity sensor includes a capacitance proximity sensor that is embedded in an exterior surface of the grip component; wherein the determining that the user is holding the gun is further based on the activation of the second proximity sensor.

In some examples, the techniques described herein relate to a method, further including: measuring acceleration of the gun along multiple axes; determining that the measured acceleration of the gun matches a signature stored in memory of the gun; and generating a second output based on the measured acceleration of the gun matching the signature, wherein performance of the boot procedure is further based on the second output.

In some examples, the techniques described herein relate to a method, further including: receiving data at a fingerprint scanner of the gun; and generating a second output in response to the fingerprint scanner receiving the data, wherein performance of the boot procedure is further based on the second output.

In some examples, the techniques described herein relate to a method, further including: generating a second signal that is representative of inductance; determining that the second signal satisfies a second threshold; and generating a second output in response to the determining that the second signal satisfying the threshold, wherein performance of the boot procedure is further based on the second output.

In some examples, the techniques described herein relate to a method, further including: directing an ultrasonic wave away from the gun; identifying a reflection of the ultrasonic wave; determining a time delta between the directing the ultrasonic wave and the identifying the reflection; and generating a second output based on the time delta satisfying a threshold, wherein performance of the boot procedure is further based on the second output.

In some examples, the techniques described herein relate to a method, further including: generating a second signal that is representative of an electromagnetic field generated based on a Hall effect sensor of the gun; determining that the second signal satisfies a second threshold; and generating a second output in response to the determining that the second signal satisfying the threshold, wherein performance of the boot procedure is further based on the second output.

In some examples, the techniques described herein relate to a grip component for a gun with a slide that moves along a recoil plane, the grip component including: an exterior surface that is visually opaque, wherein the exterior surface has a curved form defined by (i) an upper inward curve and (ii) a lower outward curve, and wherein the curved form is configured to inhibit upward movement of a hand that is substantially orthogonal to the recoil plane, so as to prevent the hand from rising into the recoil plane of the slide; a window portion of the exterior surface that is transmissible to infrared light; and an attachment mechanism that is able to removably attach the grip component to a rear grip portion of the gun through a coupling of a fastening hole with a fastener of the gun, such that the fastener contacts an interior edge of the fastening hole and an interior edge of a fastening cavity of the gun, wherein the grip component is configured such that the coupling causes the window portion of the exterior surface to be positioned over a proximity sensor such that infrared light emitted from the proximity sensor is able to pass through the window portion of the exterior surface.

In some examples, the techniques described herein relate to a grip component for a gun, the grip component including: an exterior surface that is visually opaque; a window portion of the exterior surface that is transmissible to light; and an attachment mechanism that is able to removably attach the grip component to a rear grip portion of the gun through a coupling of the grip component with the rear grip portion, wherein the grip component is configured such that the coupling of the grip component with the rear grip portion of the gun causes the window portion of the exterior surface to be positioned over a proximity sensor such that light emitted from the proximity sensor is able to pass through the window portion of the exterior surface.

In some examples, the techniques described herein relate to a grip component, wherein the grip component is configured to be removably coupled with the rear portion of the gun based on positioning a fastener in a fastening hole of the grip component such that the fastener contacts an interior edge of the fastening hole and an interior edge of a fastening cavity of the gun.

In some examples, the techniques described herein relate to a grip component, wherein the exterior surface includes a curved portion configured to protect a hand from a slide by preventing the hand from rising into a recoil plane of the slide.

In some examples, the techniques described herein relate to a grip component, wherein the window portion is transmissible to is infrared light.

In some examples, the techniques described herein relate to a grip component, wherein the window portion is non-transmissible to visible light.

In some examples, the techniques described herein relate to a grip component, wherein the window portion of the exterior surface is included of acrylic.

In some examples, the techniques described herein relate to a grip component, wherein the window portion of the exterior surface is transmissible to at least 60 percent of electromagnetic radiation with a wavelength between 800 nanometers and 1600 nanometers.

In some examples, the techniques described herein relate to a grip component, wherein the window portion of the exterior surface is transmissible to less than 10 percent of electromagnetic radiation with a wavelength lower than 700 nanometers.

In some examples, the techniques described herein relate to a grip component, wherein the window portion of the exterior surface is transmissible to less than 10 percent of electromagnetic radiation with a wavelength higher than 1700 nanometers.

In some examples, the techniques described herein relate to a grip component, wherein the proximity sensor is positioned and oriented to transmit light through the window portion of the exterior surface.

In some examples, the techniques described herein relate to a grip component, further including: an additional window portion of the exterior surface that is transmissible to light, wherein the coupling of the grip component with the rear grip portion of the gun causes the additional window portion of the exterior surface to be positioned over an additional proximity sensor such that light emitted from the additional proximity sensor is able to pass through the window portion of the exterior surface.

In some examples, the techniques described herein relate to a grip component, wherein the additional proximity sensor is positioned and oriented to transmit light through the additional window portion of the exterior surface.

In some examples, the techniques described herein relate to a grip component, wherein the attachment mechanism includes a dovetail joint that is configured to mate with a corresponding dovetail joint of the gun, wherein the coupling of the grip component with the rear grip portion of the gun is based on the dovetail joint mating with the corresponding dovetail joint of the gun.

In some examples, the techniques described herein relate to a grip component, wherein the attachment mechanism includes an aperture, wherein the coupling of the grip component with the rear grip portion of the gun is based on positioning a fastener in the aperture and in an additional aperture of the rear grip portion of the gun.

In some examples, the techniques described herein relate to a grip component, wherein the window portion is rectangular.

In some examples, the techniques described herein relate to a grip component, wherein the window portion is circular.

In some examples, the techniques described herein relate to a grip component, wherein the grip component is produced by an injection molding procedure that utilizes a mold of a hand of a user, and wherein the grip component is a custom grip component for the user.

In some examples, the techniques described herein relate to a grip component, wherein a thickness of the window portion is at least one millimeter.

In some examples, the techniques described herein relate to a grip component, wherein a surface area of the window portion is at least four square millimeters.

Remarks

The Detailed Description provided herein, in connection with the drawings, describes example configurations and does not represent all the examples that may be implemented or that are within the scope of the claims. The term "example" used herein means "serving as an illustration or instance," and not "a preferred example."

Aspects of the functions described herein may be implemented with a controller. A controller may include a special-purpose processor, a general-purpose processor, a digital signal processor (DSP), a microprocessor, an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a microprocessor), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

In the context of the specification, the term "left" means the left side of the gun when the gun is held in an upright position, where the term "upright position" generally refers to a scenario in which the gun is oriented as if in a high-ready position with the barrel roughly parallel to the ground. The term "right" means the right side of the gun when the gun is held in the upright position. The term "front" means the muzzle end (also referred to as the "distal end") of the gun, and the term "back" means the grip end (also referred to as the "proximal end") of the gun. The terms "top" and "bottom" mean the top and bottom of the gun as the gun is held in the upright position. The relative positioning terms such as "left," "right," "front," and "rear" are used to describe the relative position of components. The relative positioning terms are not intended to be limiting relative to a gravitational orientation, as the relative positioning terms are intended to be understood in relation to other components of the gun, in the context of the drawings, or in the context of the upright position described above.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A grip component for a gun, the grip component comprising:
   an exterior surface that is visually opaque;
   a window portion of the exterior surface that is transmissible to light; and
   an attachment mechanism that comprises a dovetail joint and that is able to removably attach the grip component to a rear grip portion of the gun through a coupling of the dovetail joint with a corresponding dovetail joint of the gun that is located proximate to the rear grip portion, wherein the coupling of the grip component with the rear grip portion of the gun is based on the dovetail joint mating with the corresponding dovetail joint of the gun, and wherein the grip component is configured such that the coupling of the grip component with the rear grip portion of the gun causes the window portion of the exterior surface to be positioned over a proximity sensor such that light emitted from the proximity sensor is able to pass through the window portion of the exterior surface.

2. The grip component of claim 1, wherein the exterior surface comprises a curved portion configured to protect a hand from a slide by preventing the hand from rising into a recoil plane of the slide.

3. The grip component of claim 1, wherein the window portion is transmissible to is infrared light.

4. The grip component of claims 3, wherein the window portion is non-transmissible to visible light.

5. The grip component of claim 1, wherein the window portion of the exterior surface is comprised of acrylic.

6. The grip component of claim 1, wherein the window portion of the exterior surface is transmissible to at least 60 percent of electromagnetic radiation with a wavelength between 800 nanometers and 1600 nanometers.

7. The grip component of claim 1, wherein the window portion of the exterior surface is transmissible to less than 10 percent of electromagnetic radiation with a wavelength lower than 700 nanometers.

8. The grip component of claim 1, wherein the window portion of the exterior surface is transmissible to less than 10 percent of electromagnetic radiation with a wavelength higher than 1700 nanometers.

9. The grip component of claim 1, wherein the proximity sensor is positioned and oriented to transmit light through the window portion of the exterior surface.

10. The grip component of claim 1, further comprising:
    an additional window portion of the exterior surface that is transmissible to light, wherein the coupling of the grip component with the rear grip portion of the gun causes the additional window portion of the exterior surface to be positioned over an additional proximity sensor such that light emitted from the additional proximity sensor is able to pass through the window portion of the exterior surface.

11. The grip component of claim 10, wherein the additional proximity sensor is positioned and oriented to transmit light through the additional window portion of the exterior surface.

12. The grip component of claim 1, wherein the window portion is rectangular.

13. The grip component of claim 1, wherein the window portion is circular.

14. The grip component of claim 1, wherein the grip component is produced by an injection molding procedure that utilizes a mold of a hand of a user, and wherein the grip component is a custom grip component for the user.

15. The grip component of claim 1, wherein a thickness of the window portion is at least one millimeter.

16. The grip component of claim 1, wherein a surface area of the window portion is at least four square millimeters.

* * * * *